United States Patent
Pertsel

(10) Patent No.: US 11,840,253 B1
(45) Date of Patent: Dec. 12, 2023

(54) VISION BASED, IN-VEHICLE, REMOTE COMMAND ASSIST

(71) Applicant: Ambarella International LP, Santa Clara, CA (US)

(72) Inventor: Shimon Pertsel, Mountain View, CA (US)

(73) Assignee: Ambarella International LP, Santa Clara, CA (US)

( * ) Notice: Subject to any disclaimer, the term of this patent is extended or adjusted under 35 U.S.C. 154(b) by 492 days.

(21) Appl. No.: 17/072,044

(22) Filed: Oct. 16, 2020

(51) Int. Cl.
| | |
|---|---|
| *B60W 60/00* | (2020.01) |
| *B60W 50/14* | (2020.01) |
| *B60W 30/08* | (2012.01) |
| *G06N 3/08* | (2023.01) |
| *G06V 10/75* | (2022.01) |
| *G06V 20/58* | (2022.01) |
| *G06F 18/214* | (2023.01) |

(52) U.S. Cl.
CPC .......... *B60W 60/001* (2020.02); *B60W 30/08* (2013.01); *B60W 50/14* (2013.01); *G06F 18/214* (2023.01); *G06N 3/08* (2013.01); *G06V 10/751* (2022.01); *G06V 20/58* (2022.01); *B60W 2050/143* (2013.01); *B60W 2420/42* (2013.01)

(58) Field of Classification Search
CPC .... B60W 60/001; B60W 30/08; B60W 50/14; B60W 2050/143; B60W 2420/42; G06V 20/58; G06V 10/751; G06F 18/214; G06N 3/08
See application file for complete search history.

(56) References Cited

U.S. PATENT DOCUMENTS

| | | | | |
|---|---|---|---|---|
| 9,799,213 | B1* | 10/2017 | Wang | G08C 17/02 |
| 11,443,517 | B1* | 9/2022 | Kalagher | G06V 20/52 |
| 11,578,527 | B2* | 2/2023 | Hopkins | E05F 15/77 |
| 2017/0147887 | A1* | 5/2017 | Be | G06K 9/00791 |
| 2017/0316630 | A1* | 11/2017 | Zeinstra | G07C 9/00182 |
| 2020/0340288 | A1* | 4/2020 | Ikeler | E05F 15/77 |
| 2022/0001886 | A1* | 1/2022 | Huggins | B60W 50/14 |
| 2022/0019810 | A1* | 1/2022 | Farber | G06K 9/0071 |

\* cited by examiner

*Primary Examiner* — Russell Frejd
*Assistant Examiner* — Brittany Renee Peko
(74) *Attorney, Agent, or Firm* — Christopher P. Maiorana, PC

(57) ABSTRACT

An apparatus including an interface and a processor. The interface may be configured to receive pixel data of an area external to a vehicle. The processor may be configured to generate video frames from the pixel data, perform computer vision operations on the video frames to detect objects in the video frames and determine characteristics of the objects, analyze the characteristics of the objects to determine a visually observable status of the objects, perform a comparison of the visually observable status to a remote command and send the remote command if the comparison determines that the visually observable status does not match the remote command. The remote command may be configured to control the visually observable status of the objects.

20 Claims, 13 Drawing Sheets

US 11,840,253 B1

VISION BASED, IN-VEHICLE, REMOTE COMMAND ASSIST

FIELD OF THE INVENTION

The invention relates to computer vision generally and, more particularly, to a method and/or apparatus for implementing vision based, in-vehicle, remote command assist.

BACKGROUND

Many modern vehicles integrate garage remote control to enable opening or closing the garage directly from the vehicle. One example integrated garage remote control is Homelink, which provides a vehicle-based wireless control system that enables a user to control various home features (i.e., open and close a garage door/front gate, activate and deactivate a home security system, turn on/off home lighting, appliances and electronics, etc.). Conventional implementations of remote home control implement features such as opening a garage through a dedicated button or through the vehicle infotainment system user interface. Some vehicles have implemented GPS-based automatic aid (i.e. "auto-open" or "auto-close"), which allows the vehicle to automatically open the garage when approaching the house and automatically close the garage when exiting. The remote home control offers significant convenience to the consumer as the garage is automatically opened or closed based on when the user is approaching or leaving the home.

Conventional implementations of vehicle-based, remote home control have several important drawbacks. GPS accuracy and range limitations mean that the "open" function is often invoked in non-optimal locations. For example, invoking the open function from a non-optimal location results in failing to open the garage. Another drawback is that the function merely sends a command based on location without context. For example, a garage door may already be open when approaching the house and what is supposed to be an "auto-open" function would instead close the door instead of opening the door. Similarly, if the garage door is already closed when leaving the house (i.e., another member of the household manually closes the door), what is intended to be an "auto-close" command instead opens the garage door. Another drawback is that reliability is not 100%. Sometimes the intended action fails, but the vehicle has no way of knowing whether the command failed and the driver is not notified.

It would be desirable to implement vision based, in-vehicle, remote command assist.

SUMMARY

The invention concerns an apparatus comprising an interface and a processor. The interface may be configured to receive pixel data of an area external to a vehicle. The processor may be configured to generate video frames from the pixel data, perform computer vision operations on the video frames to detect objects in the video frames and determine characteristics of the objects, analyze the characteristics of the objects to determine a visually observable status of the objects, perform a comparison of the visually observable status to a remote command and send the remote command if the comparison determines that the visually observable status does not match the remote command. The remote command may be configured to control the visually observable status of the objects.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
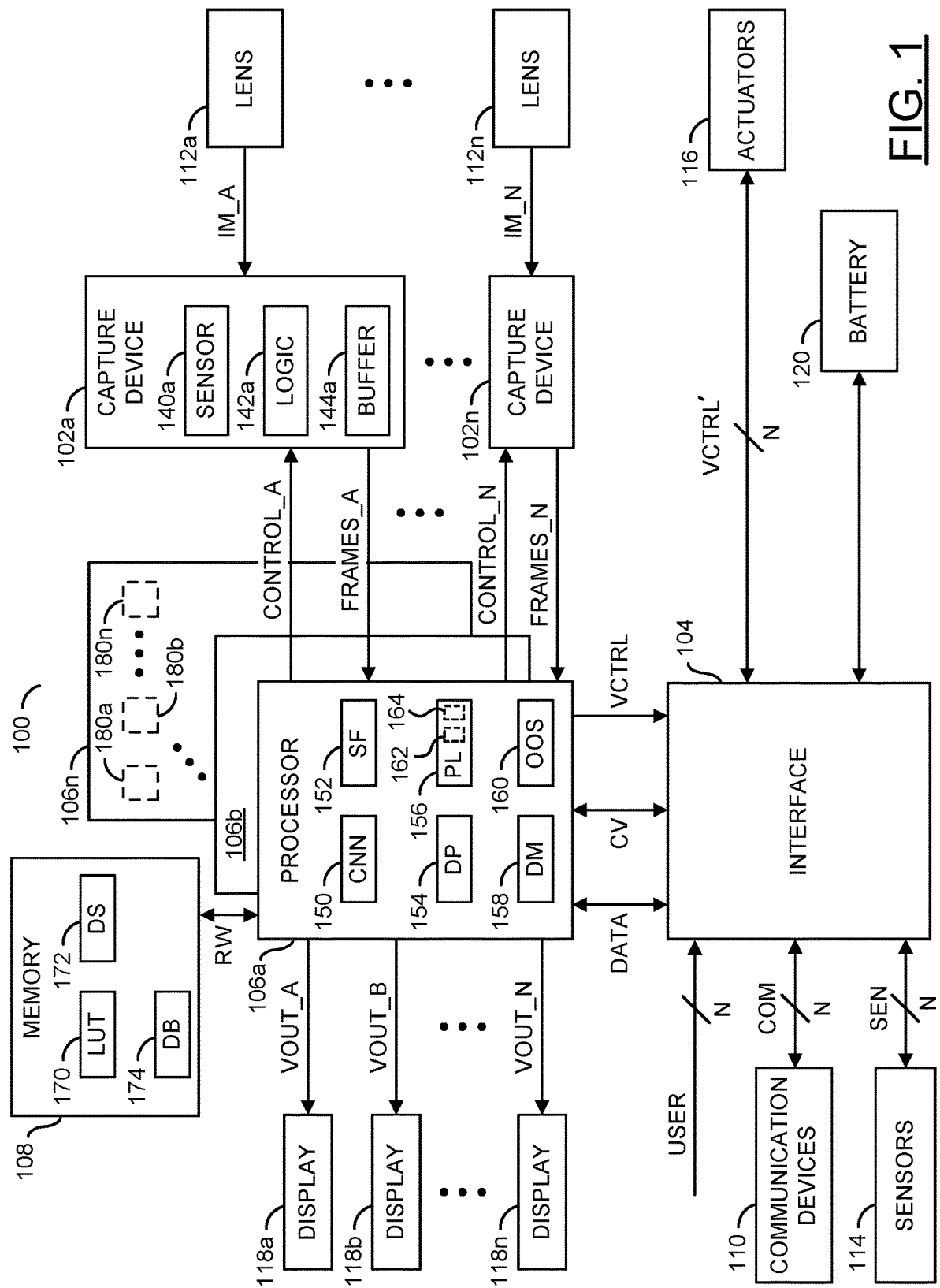
FIG. 1 is a diagram illustrating an embodiment of the present invention.

Embodiments of the present invention include providing vision based, in-vehicle, remote command assist that may (i) implement computer vision to aid remote home control features, (ii) use visual feedback to confirm that a remotely invoked action communicated by a remote command has been executed as expected, (iii) provide context-based remote commands, (iv) re-attempt to invoke a command when a previous command fails, (v) store location-based data to determine locations where commands have been successful or have failed, (vi) generate notifications for the driver, (vii) train a remote home control system automatically using computer vision without manual input and/or (viii) be implemented as one or more integrated circuits.

Embodiments of the present invention may be configured to implement computer vision to supplement a vehicle-based remote home control system. Results of the computer vision operations may be used to determine when to trigger remote commands. Results of the computer vision operations may be used to confirm a success or failure of the remote commands triggered. Increasing penetration of forward-looking cameras in vehicles (e.g., for ADAS, drive recording, voluntary mandate, etc.), increasing penetration of back-up cameras and/or increasing penetration of 360 degree viewing in vehicles may provide an opportunity to improve the reliability and/or convenience of remote commands invoked by a vehicle-based remote home control system.

One example feature of a vehicle-based remote home control system that may be supplemented using the computer vision operations may be an "auto-open" feature (e.g., opening a garage door when a vehicle returns close to the home). In one example, after invoking an auto-open command, computer vision operations may be used to confirm that the garage door has begun to open. If the garage door has not begun to open (or is not already open), then the auto-open command may be repeated until the command succeeds.

When the auto-open command succeeds or fails, a location where the command was invoked may be stored. Visual self-location of the vehicle may be determined using computer vision and/or GPS/GNSS mapping may be used to precisely locate the vehicle when the command succeeded. For future attempts to automatically open the garage door, the vehicle-based remote home control system may invoke the commands from the stored successful locations and/or avoid sending the commands from stored locations where the command failed.

One example feature of a vehicle-based remote home control system that may be supplemented using the computer vision operations may be an "auto-close" feature (e.g., closing a garage door when a vehicle leaves the home). In one example, after invoking an auto-close command, computer vision operations may be used to confirm that the garage door has begun to close. If the garage door has not begun to close (or is not already closed), then the auto-close command may be repeated until the command succeeds.

When the auto-close command succeeds or fails, a location where the command was invoked may be stored. Visual self-localization of the vehicle may be determined using computer vision and/or GPS/GNSS mapping may be used to precisely locate the vehicle when the command succeeded. For future attempts to automatically close the garage door, the vehicle-based remote home control system may invoke the commands from the stored successful locations and/or avoid sending the commands from stored locations where the command failed.

To avoid leaving the garage door open, which may be a security risk for the homeowner, the computer vision and/or mapping may be used to determine when the vehicle is already too far from the garage to successfully send the auto-close command. A warning may be generated to notify the driver that the garage door was not successfully closed. The warning may be a visual message (e.g., a notification presented on a display screen of an infotainment system of the vehicle). The warning may be an audio message (e.g., an alarm sound). Computer vision may also be implemented to ensure that the vehicle has completely exited the garage before the auto-close command is invoked.

Computer vision may be implemented to determine a visually observable status and/or context for invoking a command. For example, instead of providing a universal signal (e.g., a signal to a garage door opener that will either open the door when the door is closed or close the door when the door is open), the computer vision system may enable a context based control signal. In one example, the computer vision system may detect that the garage door is closed and only invoke the auto-open command when the garage door is closed (e.g., prevent closing the door when the vehicle returns home). In another example, the computer vision system may detect that the garage door is open and only invoke the auto-close command when the garage door is open (e.g., prevent opening the garage door when the vehicle is leaving the home).

Embodiments of the present invention may enable training of the vehicle-based remote home control system. Generally, vehicle-based remote home control systems are trained using manual confirmation about the status of the control target (e.g., the homeowner has to supervise the results to ensure that the garage indeed reacted to the car sending signals). Computer vision operations may be configured to provide the confirmations when training the vehicle-based remote home control system.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAMES_A-FRAMES_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth sensing (e.g., the signals FRAMES_A-FRAMES_N may comprise depth information and/or vector light data in addition to the video frames). In one example, the capture devices 102a-102n and/or the processors 106a-106n may perform depth sensing using multiple cameras (e.g., cameras configured as a stereo pair to capture a depth map). In another example, the capture devices 102a-102n and/or the processors 106a-106n may perform depth sensing using time-of-flight. In yet another example, the capture devices 102a-102n and/or the processors 106a-106n may perform depth sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., daytime and nighttime).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras. The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n (e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180a may schedule the operators based on when the operators may be ready to be processed by the hardware engines 180a-180n.

The scheduler circuit 180a may time multiplex the tasks to the hardware modules 180a-180n based on the availability of the hardware modules 180a-180n to perform the work. The scheduler circuit 180a may parse the directed acyclic graph into one or more data flows. Each data flow may include one or more operators. Once the directed acyclic graph is parsed, the scheduler circuit 180a may allocate the data flows/operators to the hardware engines 180a-180n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One or more of the dedicated hardware modules 180a-180n may be configured to extract feature points from the video frames. The CNN module 150 may be configured to analyze pixels of the video frames and/or groups of pixels of the video frame. One or more of the dedicated hardware modules 180a-180n may be configured to perform particular mathematical operations that may be performed multiple times to perform the analysis of the pixels and/or groups of pixels. The operations performed by the dedicated hardware modules 180a-180n may be configured to calculate descriptors based on the feature points. The dedicated hardware modules 180a-180n may be configured to compare the descriptors to reference descriptors stored in the memory 108 to determine whether the pixels of the video frames correspond to a particular object.

Figure 2:
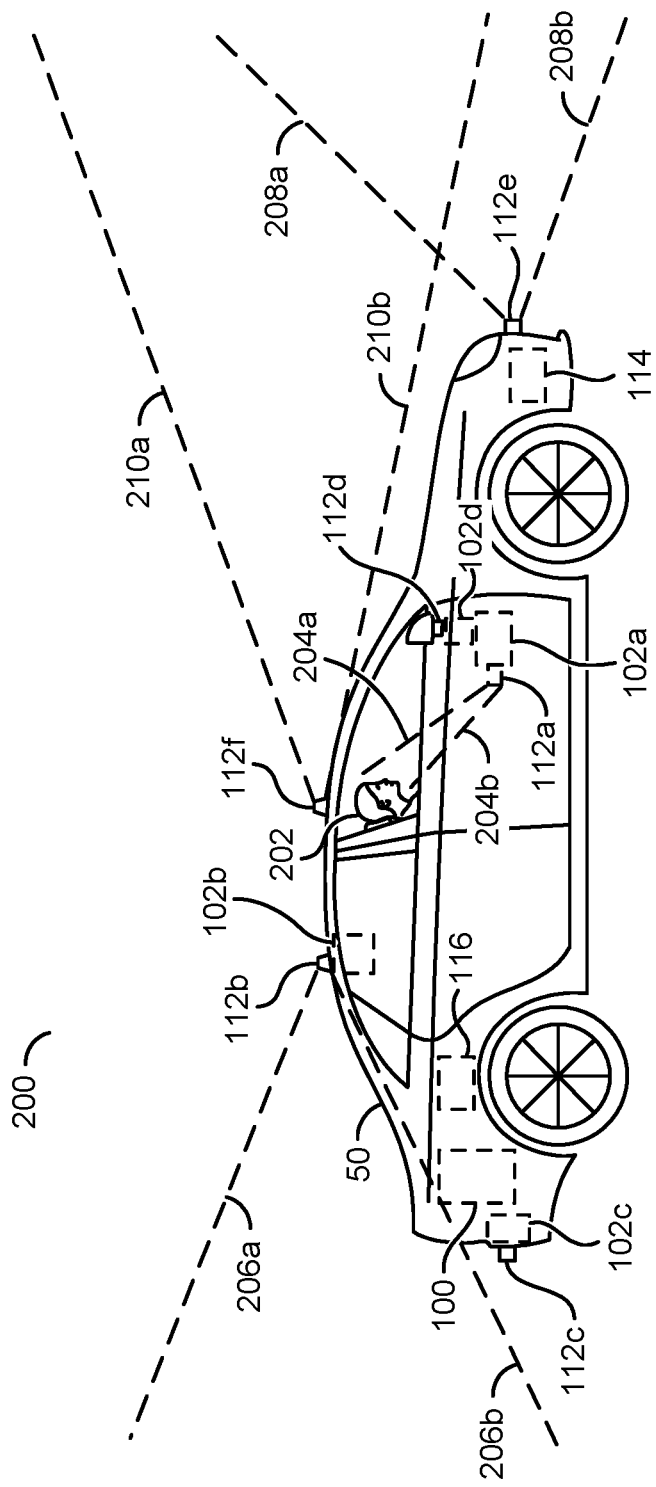
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b captured by the lens 112e) may provide a front exterior view of an area. In another example, a redundant targeted view (e.g., represented by a line 210a and a line 210b captured by the lens 112f) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as alive stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
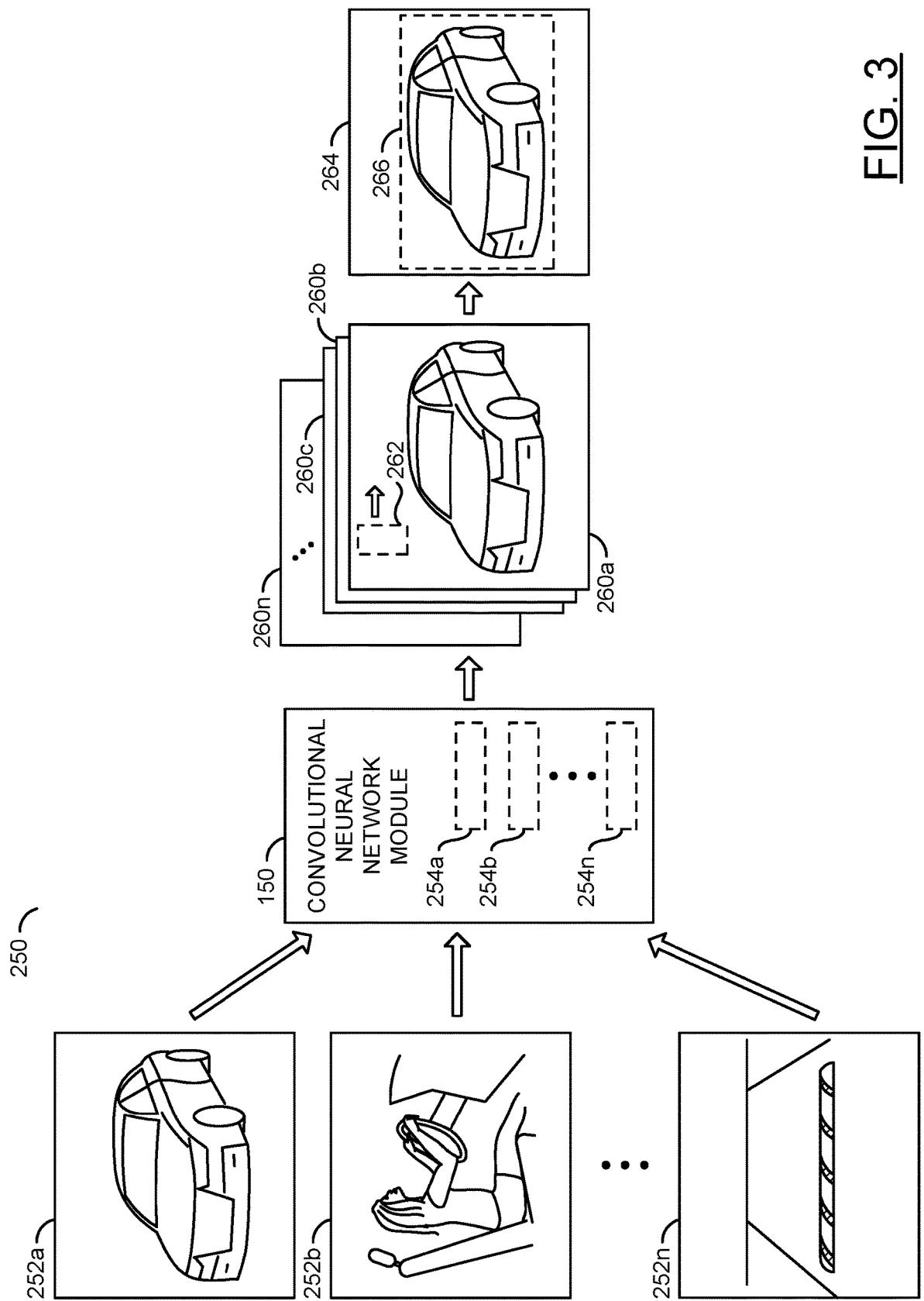
FIG. 3 is a diagram illustrating computer vision operations.

Referring to FIG. 3, a diagram illustrating an example visualization of training a convolutional neural network for object detection is shown. A training and/or object detection visualization 250 is shown. The training and/or object detection visualization 250 may comprise the CNN module 150. Image and/or video frames 252a-252n are shown. The images and/or video frames 252a-252n may be training data. In one example, the training data 252a-252n may be generated by the processors 106a-106n in response to pixel data captured by the capture devices 102a-102n. In another example, the training data 252a-252n may be image data from other sources (e.g., images previously captured by the camera system 100, images received from a database of images (e.g., stock images), images captured by a fleet of vehicles and uploaded to a database of images, etc.). The source of the training data 252a-252n may be varied according to the design criteria of a particular implementation.

To detect objects using computer vision, the convolutional neural network 150 may be trained using the training data 252a-252n. The training data 252a-252n may comprise a large amount of information (e.g., input video frames). The training data 252a-252n may be labeled. The labels for the training data 252a-252n may be provided as metadata of the video frames. Labeling the training data 252a-252n may enable the CNN module 150 to have a ground truth basis for determining which objects are present in the training data 252a-252n.

The CNN module 150 is shown comprising blocks (or circuits) 254a-254n. The blocks 254a-254n may implement artificial intelligence models. The artificial intelligence models 254a-254n may be configured to be trained to detect particular objects. Each of the artificial intelligence models 254a-254n may be trained to recognize, classify and/or distinguish one or more types of objects. The number of artificial intelligence modules 254a-254n implemented by the CNN module 150 and/or the type(s) of objects detected by each one of the artificial intelligence models 254a-254n may be varied according to the design criteria of a particular implementation.

In the example shown, the training data 252a may comprise an image of a vehicle, the training data 252b may comprise an image of a driver and the training data 252n may comprise an image of a road obstacle (e.g., a speedbump). In one example, the training data 252a may comprise a label indicating that the video frame comprises a vehicle. In another example, the training data 252a may comprise a label indicating that the video frame comprises a particular make/model/year of a vehicle. If the artificial intelligence model 254a is configured to detect vehicles, the training data image 252a may provide a ground truth sample of a vehicle and the training data 252b may be an example image of objects that are not a vehicle. If the artificial intelligence model 254b is configured to detect a driver (or driver behavior), the training data 252b may provide a ground truth sample of a person performing a particular behavior (e.g., driving).

The artificial intelligence models 254a-254n may be trained in response to the training data 252a-252n when the CNN module 150 operates in the training mode of operation. In one example, the artificial intelligence models 254a-254n may be directed acyclic graphs. In the training mode of operation, the artificial intelligence models 254a-254n may analyze many examples of objects. In one example, if the artificial intelligence model 254a is configured to detect vehicles, the artificial intelligence model 254a may analyze many examples of vehicle images. Training the artificial intelligence models 254a-254n may determine and/or calculate parameters and/or weighting values for a directed acyclic graph.

The trained artificial intelligence models 254a-254n may be a directed acyclic graph with parameters and/or weighting values pre-programmed and/or pre-defined (e.g., based on self-directed learning) for detecting particular types of objects. In some embodiments, the trained artificial intelligence models 254a-254n may be a quantized neural network (e.g., a reduced size neural network configured to operate on an edge device that has been modeled based on a full size neural network that was trained offline).

While the apparatus 100 is in operation, the CNN module 150 may continually learn using new video frames as the input training data 252a-252n. However, the processors 106a-106n may be pre-trained (e.g., configured to perform computer vision before being installed in the ego vehicle 50). For example, the results of training data 252a-252n (e.g., the trained artificial intelligence models 254a-254n) may be pre-programmed and/or loaded into the processors 106a-106n. The processors 106a-106n may conduct inferences against the artificial intelligence models 254a-254n (e.g., to perform object detection). In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

The CNN module 150 may receive the training data 252a-252n in a training mode of operations. The CNN module 150 may analyze captured video frames (e.g., generated from the signals FRAMES_A-FRAMES_N) to detect objects, classify objects and/or extract data about objects using the trained artificial intelligence models 254a-254n. To perform the training and/or the computer vision operations, the CNN module 150 may generate a number of layers 260a-260n for a video frame. On each one of the layers 260a-260n, the CNN module 150 may apply a feature detection window 262. In an example, the feature detection window 262 is shown on a portion of the layer 260a. A convolution operation may be applied by the CNN module 150 on each of the layers 260a-260n using the feature detection window 262.

The convolution operation may comprise sliding the feature detection window 262 along groups of pixel data for each of the layers 260a-260n while performing calculations (e.g., matrix operations). The feature detection window 262 may apply a filter to pixels that are within the current location of the feature detection window 262 and/or extract features associated with each layer 260a-260n. The groups of pixels within the feature detection window 262 may be changed as the feature detection window 262 slides along the pixels of the layers 260a-260n. The feature detection window 262 may slide along the layers 260a-260n pixel by pixel to capture and/or analyze different groupings of pixels. For example, a first location of the feature detection window 262 may comprise a box of pixels A0 through D0 and A3 through D3 and then the feature detection window may slide horizontally one pixel to comprise a box of pixels B0 through E0 and B3 through E3 (e.g., the pixels from B0 through D0 and B3 through D3 are used in both the first and second operation). The size of the feature detection window 262 and how far (e.g., a stride length) the feature detection window 262 moves for each operation may be varied according to the design criteria of a particular implementation.

The feature detection window 262 may be applied to a pixel and a number of surrounding pixels. In an example, the layers 260a-260n may be represented as a matrix of values representing pixels and/or features of one of the layers 260a-260n and the filter applied by the feature detection window 262 may be represented as a matrix. The convolution operation may apply a matrix multiplication between the region of the current layer covered by the feature detection window 262. The convolution operation may slide the feature detection window 262 along regions of the layers 260a-260n to generate a result representing each region. The size of the region, the type of operations applied by the filters and/or the number of layers 260a-260n may be varied according to the design criteria of a particular implementation.

Using the convolution operations, the CNN module 150 may compute multiple features for pixels of an input image in each extraction step. For example, each of the layers 260a-260n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 262 operates on a pixel and nearby pixels, the results of the operation may have location invariance. The layers 260a-260n may comprise convolution layers, pooling layers, non-linear layers and/or fully connected layers. In an example, the convolution operations may learn to detect edges from raw pixels (e.g., the first layer 260a), then use the feature from the previous layer (e.g., the detected edges) to detect shapes in a next layer (e.g., 260b) and then use the shapes to detect higher-level features (e.g., facial features, vehicles, pedestrians, etc.) in higher layers and the last layer may be a classifier that uses the higher level features.

In the training mode of operation, training the artificial intelligence models 254a-254n may comprise determining weight values for each of the layers 260a-260n. For example, weight values may be determined for each of the layers 260a-260n for feature extraction (e.g., a convolutional layer) and/or for classification (e.g., a fully connected layer). The weight values learned by the artificial intelligence models 254a-254n may be varied according to the design criteria of a particular implementation.

The CNN module 150 may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150 to extract features from the training data 252a-252n may be varied according to the design criteria of a particular implementation.

The CNN module 150 may receive and analyze input images (e.g., the training data 252a-252n in the training mode of operation and/or input video frames when deployed in the ego vehicle 50) that have multiple color channels (e.g., a luminance channel and two chrominance channels). A color detection process implemented by the video pipeline module 156 may be configured to output images with color likelihood (or probability) values for a particular color at one or more pixel locations in the input images. For example, shared buffers between the video pipeline module 156 and/or the CNN module 150 may enable information sharing between components of the processors 106a-106n. The color detection process may be used to extract features from the training data 252a-252n and/or input video frames.

The color detection and/or feature extraction process is generally operational to determine a color likelihood value that pixels in each pixel location of an input image (e.g., the training data 252a-252n during training and/or input video frames during the object detection mode of operation) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by a camera (e.g., the capture device 102a and/or the lens 112a) through an inverse perspective mapping.

The CNN module 150 may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicate a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 262 may be considered by the color detection process on one of the layers 260a-260n. The feature extraction window 262 may consider a pixel of interest. In an example, the pixel of interest may be a current pixel location being color classified. The feature extraction window 262 may generally represent a local context and contrast around the pixel of interest.

The pixels of the training data 252a-252n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150 may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150 generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

The CNN module 150 may generate one or more reference video frames 264. The reference video frame 264 may comprise masks and/or categorized instances of the reference objects 266. The reference objects 266 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases and/or exterior view use cases. The computer vision operations performed by the CNN module 150 may determine a size, shape, orientation and/or arrangement of a recognized object.

By analyzing a number of video frames in sequence, the computer vision operations performed by the CNN module 150 may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150.

In some embodiments, machine learning may be performed by the centralized CNN module that has access to greater computing resources than the camera system 100. Generally, the processing capabilities and/or computing resources available to the centralized CNN module (e.g., implemented as part of a cloud computing network) may be greater than the processing capabilities and/or computing resources available to the CNN module 150 implemented by the processors 106a-106n. For example, the centralized CNN module may perform the machine learning using the training data 252a-252n, develop a machine learning model (e.g., the artificial intelligence models 254a-254n), and then provide the machine learning model to the apparatus 100. In some embodiments, the artificial intelligence models 254a-254n trained using the centralized CNN module may be quantized to be used by the CNN module 150 of the camera system 100.

Even after the artificial intelligence models 254a-254n have been trained and the CNN module 150 has been deployed, the processors 106a-106n may continue to receive the training data 252a-252n. New training data may be used to refine the machine learning model, and then provide updates to the artificial intelligence models 254a-254n. In some embodiments, the labeled training data 252a-252n used to refine the artificial intelligence models 254a-254n may be received using the communication device 110.

In some embodiments, the machine learning may be performed by the CNN module 150 implemented by the processors 106a-106n. For example, the processors 106a-106n and/or the apparatus 100 may be an edge device, and the CNN module 150 may implement the machine learning model adapted to the constraints of the edge device. The processors 106a-106n may be configured to compress the machine learning model (e.g., compressed compared to the machine learning model implemented by the centralized CNN module). In an example, compressing the machine learning model may comprise quantization, pruning, sparsification, etc. Compressing the machine learning model may enable the CNN module 150 to perform the machine learning and/or conduct inferences against the artificial intelligence models 254a-254n (e.g., object detection). By performing the machine learning at the edge (e.g., locally on the processors 106a-106n), there may be reduced latency compared to performing wireless communication with the centralized CNN module. Similarly, the apparatus 100 may be able to perform the machine learning without maintaining a wireless connection. By performing the machine learning at the edge, privacy may be maintained since the training data 252a-252n would be kept local. Whether the machine learning is performed locally (e.g., at the edge), performed using a centralized resource and/or performed using a combination of local and centralized resources may be varied according to the design criteria of a particular implementation.

The machine learning performed by the CNN module 150 may comprise supervised training. For example, the CNN module 150 may be self-trained using the training data 252a-252n. Supervised learning may enable the CNN module 150 to automatically adjust the weighting values in response to metadata contained within the training data 252a-252n (e.g., a designer and/or engineer may not need to program the weighting values). The metadata contained within the training data 252a-252n may provide ground truth data. Backpropogation may be implemented to compute a gradient with respect to the weighting values in response to the training data 252a-252n. For example, the training data 252a-252n may comprise the metadata labels that may enable the CNN module 150 to extract characteristics and apply the extracted characteristics to the weighting values based on the metadata labels.

In one example, where the training data 252a-252n is labeled as providing an image of a vehicle, the CNN module 150 may extract the features from the image and apply the extracted features to the weighting values to make future computer vision operations more accurately determine whether a vehicle is present. Similarly, where the training data 252a-252n is labeled as not providing an image of a vehicle, the CNN module 150 may extract the features from the image and apply the extracted features to the weighting values to make future computer vision operations more accurately determine whether a vehicle is present (e.g., particular weighting values may be decreased to de-emphasize particular features that may not be associated with a vehicle). The CNN module 150 may implement a deep convolutional neural net (DCNN) to enable features important to determining particular classes to be learned by the CNN module 150 through training.

The labels for the training data 252a-252n may be acquired through various sources. In one example, the training data 252a-252n may be labeled manually (e.g., a person may provide input to indicate which objects are present in a video frame). In another example, the training data 252a-252n may be labeled using sensor fusion. For example, sensor readings may provide the label (e.g., a temperature sensor may indicate a cold environment, an accelerometer and/or a gyroscope may indicate an orientation of the ego vehicle 50, an accelerometer and/or gyroscope may indicate whether an impact has been detected, a proximity sensor may provide a distance value between the ego vehicle 50 and another object, etc.). The sensor fusion module 152 may enable the metadata labels to provide a ground truth value. The source of the labels for the training data 252a-252n may be varied according to the design criteria of a particular implementation.

Figure 4:
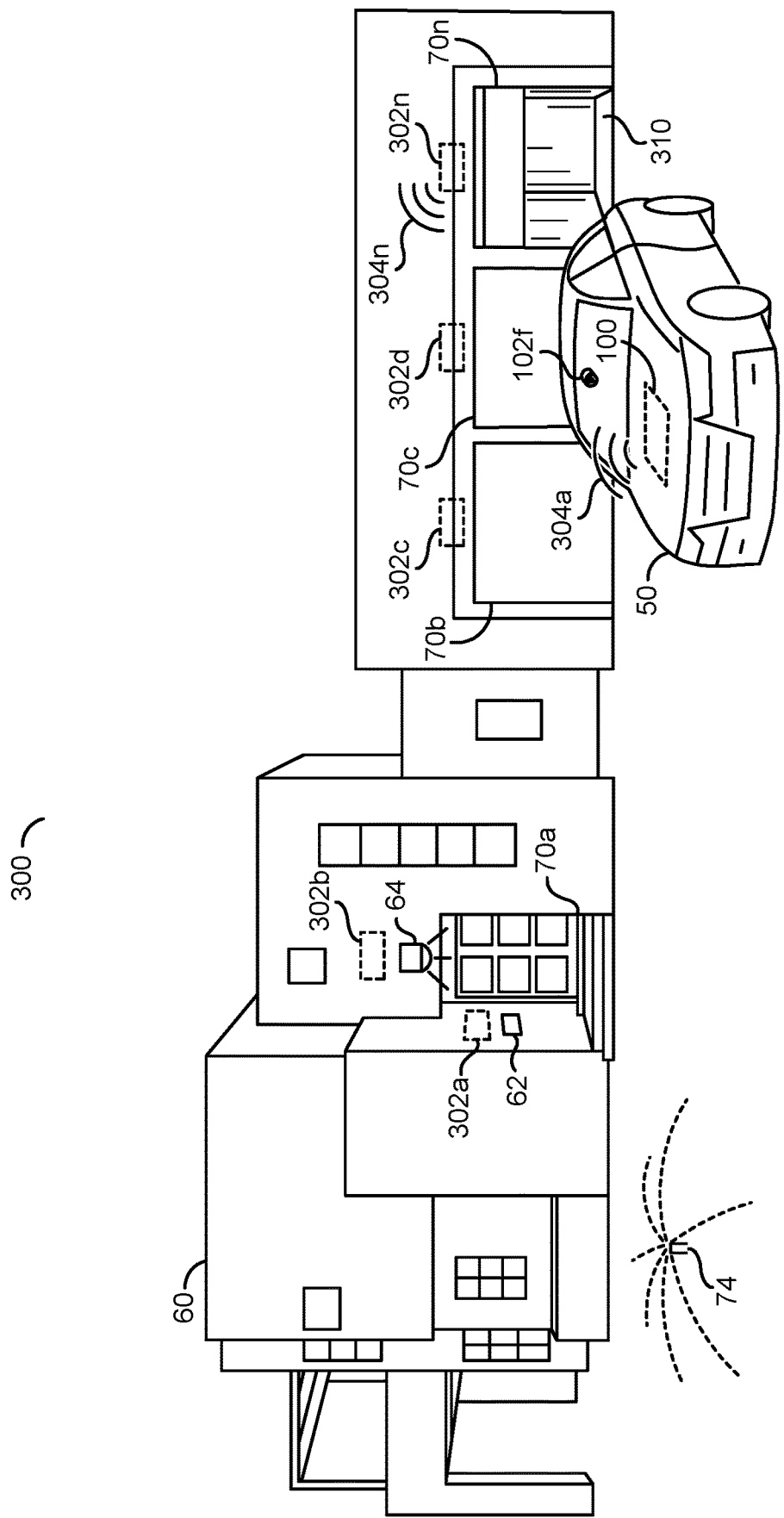
FIG. 4 is a diagram illustrating a system configured to control visually observable objects using a location-based vehicle system.

Referring to FIG. 4, a diagram illustrating a system configured to control visually observable objects using a location-based vehicle system is shown. An example scenario 300 is shown. The example scenario may comprise a building 60. In the example shown, the building 60 may be a home. In another example, the building 60 may be a business (e.g., an office, a factory, a warehouse, etc.). In yet another example, the building 60 may be a rental property. The type of building 60 may be varied according to the design criteria of a particular implementation.

The ego vehicle 50 is shown near the building 60. The ego vehicle 50 is shown comprising the camera system 100. The capture device 102f is shown installed on the ego vehicle 50 as a representative example of one of the capture devices 102a-102n. In one example, the ego vehicle 50 may be arriving at the home 60 (e.g., returning home). In another example, the ego vehicle 50 may be leaving the home 60. The features of the camera system 100 may be implemented when the ego vehicle 50 is returning to the home 60 and/or when the ego vehicle 50 is leaving the home 60.

The home 60 is shown comprising a device 62. The device 62 may represent a home security system. The home 60 is shown comprising a device 64. The device 64 may comprise a light. The home 60 is shown comprising a number of entryways 70a-70n. The entryway 70a may be a front door. The entryways 70b-70n may comprise garage doors. In the example, shown, the light 64 may be a light for the front doorway 70a. The home 60 is shown comprising a device 74. The device 74 may be a home sprinkler system. The devices 62-74 may each be a representative example of an observable device. The observable devices (or objects) 62-74 may be configured to respond to remotely invoked actions. The remotely invoked actions may be configured to change a visually observable status of the observable devices 62-74.

Blocks (or circuits) 302a-302n are shown in/on the home 60. The circuits 302a-302n may implement receivers. The receivers 302a-302n may be receivers for a remote home control system. The remote home control system may comprise other components (not shown). In one example, the remote home control system may comprise a central device (e.g., a local server) that may be connected to the receivers 302a-302n. In another example, the receivers 302a-302n may each comprise communication devices configured to establish an internet connection (e.g., Wi-Fi, hardwire connection, etc.) and each of the receivers 302a-302n may be connected to a cloud-based service. For simplicity, the receivers 302a-302n may be representative of the remote home control system. The implementation of the remote home control system may be varied according to the design criteria of a particular implementation.

The receivers 302a-302n may be configured to control a status (e.g., an operational status, a visually observable status, a functionality, etc.) of a connected device. The receiver 302a may be configured to control a status of the home security system 62 (e.g., arm/disarm the home security system 62). The receiver 302a may be further configured to control a status of the home sprinkler system 74 (e.g., activate/deactivate the home sprinkler system 74, control one or more nozzles of the home sprinkler system 74, etc.). The receiver 302b may be configured to control a status of the light 64 (e.g., turn the light 64 on/off). The receiver 302b may be further configured to control a status of the front entryway 70a (e.g., lock/unlock the front door 70a, open/close the front door 70a, etc.). The receiver 302c may control a status of the garage door 70b, the receiver 302d may control a status of the garage door 70c, the receiver 70n may control a status of the garage door 70n (e.g., open/close one of the garage doors).

Other receivers 302a-302n may be implemented in the home 60 to control various other aspects of the home 60 (e.g., activate/deactivate a heating system, activate/deactivate a cooling system, open/close window coverings such as blinds, curtains and/or motorized shutters, activate/deactivate an audio system, open close a gate, etc.). The number of receivers 302a-302n implemented by the building 60 and/or the types of devices and/or aspects of the home controlled by the receivers 302a-302n may be varied according to the design criteria of a particular implementation.

The receivers 302a-302n may comprise an actuator. In one example, the receivers 302a-302n may be the actuators 116. In some embodiments, the receivers 302a-302n may designed to interact with a particular type of aspect of the building 60. For example, the receiver 302c may be configured as a garage door opener. In another example, the receiver 302b may be configured to connect to an electrical system of the building 60 to control the light 64. In some embodiments, the receivers 302a-302n may provide an API and various aspects of the building 60 may communicate using the API. For example, a garage door opener that controls the garage door 70b may be installed in the home 60 and the receiver 302b may provide control signals for controlling the garage door opener to change the status of the garage door 70b. The method of control of the various components and/or aspects of the home by the receivers 302a-302n may be varied according to the design criteria of a particular implementation.

Curved lines 304a-304n are shown. In the example shown, the curved lines 304a may be extending from the camera system 100 and the curved lines 304n may be extending from the receiver 302n. The curved lines 304a-304n may represent wireless communication between the camera system 100 and one or more of the receivers 302a-302b. In one example, the communication devices 110 of the camera system 100 may directly communicate with a communication device implemented by one or more of the receivers 302a-302n. In another example, the communication devices 110 of the camera system 100 may communicate to a cloud service used to implement the remote home control system and the cloud service may forward communications between the communication devices 110 and the receivers 302a-302n. In yet another example, the communication devices 110 of the camera system 100 may communicate with a local server used to implement the remote home control system in the home 60 and the local server may forward commands between communication devices 110 and the receivers 302a-302n.

The wireless communication 304a-304n may represent a remote command. In the example shown, the remote command 304a-304n may be communicated by the camera system 100. In some embodiments, the remote command 304a-304n may be communicated by another communication system implemented by the ego vehicle 50. The remote command 304a-304n may be configured to control a status of components and/or aspects of the building 60. In one example, the remote command 304a-304n may be configured to control a status of an entryway (e.g., open/close the front door 70a and/or the garage doors 70b-70n). In another example, the remote command 304a-304n may be configured to control a status of the light 64. In yet another example, the remote command 304a-304n may be configured to control a status of the home security system 62. In still another example, the remote command 304a-304n may be configured to control a status of the sprinkler system 74. The remote command 304a-304n may communicate a remotely invoked action. The remotely invoked action presented in the remote command 304a-304n may cause the receivers 302a-302n to change the status of the devices 62-74. The change of status communicated and/or the type of device controlled using the remote command 304a-304n may be varied according to the design criteria of a particular implementation.

User permissions may be communicated using the remote command 304a-304n. For example, the receivers 302a-302n may not perform the change in status communicated using the remote command 304a-304n unless the ego vehicle 50 and/or the camera system 100 has permission to perform the command for the building 60. In one example, the home 60 may be owned by the driver 202. In another example, the driver 202 may be a household member of the home 60. The user permissions for communicating the remote command 304a-304n may be set up in advance of communicating the remote command 304a-304n. Which users have permission to provide the remote command 304a-304n may be varied according to the design criteria of a particular implementation.

In the example shown, the remote command 304a-304n may be communicated by the camera system 100 and the receiver 302n. For example, the remote command 304a-304n may be configured to change the status of the garage door 70n. In one example, the change of status of the garage door 70n may be an open command (e.g., open a closed garage door). In another example, the change of status of the garage door 70n may be close command (e.g., close an opened garage door).

A status 310 of the garage door 70n is shown. The status 310 may be an opened door. In one example, with the opened door status 310 shown, the garage door 70n may be in the process of opening. In another example, with the opened door status 310 shown, the garage door 70n may be in the process of closing. When the ego vehicle 50 is leaving the home 60, the camera system 100 may be configured to ensure that the status 310 of the garage door 70n is closed (or closing). When the ego vehicle 50 is returning to the home 60, the camera system 100 may be configured to ensure that the status 310 of the garage door 70n is opened (or opening). The camera system 100 may be configured to perform the computer vision operations on video frames (or a sequence of video frames) to determine the status 310 of the garage door 70n.

The computer vision operations may be configured to determine the visually observable status of various features, systems and/or components of the building 60 that may be remotely controlled and provide visual feedback (e.g., observable devices capable of invoking actions provided in the remote command 304a-304b). The processors 106a-106n may determine the visually observable status of the features, systems and/or components based on the visual feedback to determine the success or failure of the remote command 304a-304n. In one example, the light 64 may provide visual feedback of the status of the light (e.g., on or off). The computer vision operations may be configured to determine the presence and/or the intensity of the light emitted by the light 64. The visual information of whether the light is on or off (e.g., the visually observable status) may be used to determine whether the remote command 304a-304n successfully turned the light 64 on or off.

In another example, the sprinkler system 74 may provide visual feedback of the status of the sprinkler (e.g., on or off). The computer vision operations may be configured to determine the presence of water being sprayed by the sprinkler 74. For example, the computer vision operations may determine the visually observable status of the sprinkler 74 by detecting a direction and/or source of water (e.g., determine if water is not present at all as an indication that the sprinkler 74 is off, distinguish between water detected from rainfall and water emitted by the sprinkler 74, etc.). A visually observable status of other remotely controlled devices, such as motorized window shades may be determined using the computer vision operations (e.g., detect whether the shutters are covering the windows based on a location of the windows and a detected location of the shutters).

Some remotely controlled devices, features and/or systems may not provide visual feedback. In the example, the home security system 62 may be implemented with an indoor panel (e.g., not visible by the camera system 100 in the ego vehicle 50 that is outside the home 60). In another example, if the home security system 62 provides an outdoor indicator light (e.g., red light for armed, green light for disarmed), then the processors 106a-106n may be configured to extract the visual information to confirm a match between the visually observable status of the home security system 62 and an action invoked by the remote command 304a-304n. In yet another example, the status of indoor lighting may be determined using computer vision operations to detect the light through the windows of the building 60.

Some remotely controlled devices may not be easily observable from outside the building 60. In one example, a home heating/cooling system may be desired to be activated/deactivated when the ego vehicle 50 is leaving/returning to the building 60. However, the status of the heating/cooling system may not be directly visually observable. In some embodiments, a proxy device may be implemented to provide a visually observable indication of the status of a remotely controlled device. In one example, the panel 62 may change colors based on the status of various indoor devices. For example, when the heating system in the building is activated, the panel 62 may change to a red color and the when the cooling system is activated, the panel 62 may change to a blue color. The color change of the panel 62 may provide the visually observable status to enable the camera system 100 to confirm that the remote action invoked by the remote command 304a-304n has been communicated successfully. The location and/or color combinations on the panel 62 (e.g., a proxy device) may be detected as the visually observable status for indoor remotely controlled devices.

In some embodiments, the communication devices 110 may be configured to receive a video feed generated by cameras inside the building 60. The processors 106a-106n may be configured to perform the computer vision operations to determine whether the remote command 304a-304n has been communicated successfully by extracting the visually observable status of a device in response to the video frames in the streamed indoor video. In an example, when the ego vehicle 50 is leaving the building 60, the remote command 304a-304n may be communicated to invoke a remote action of turning off all the lights inside the home. Cameras within the building 60 may stream video frames to the camera system 100. The processors 106a-106n may perform the computer vision operations on the video stream to determine whether indoor lights have been turned off. If the indoor lights have not been turned off, based on the visually observable status of the lights inside the home, the processors 106a-106n may be configured to re-send the remote command 304a-304n (or notify the driver 202 that the command failed and the lights have not been turned off).

Figure 5:
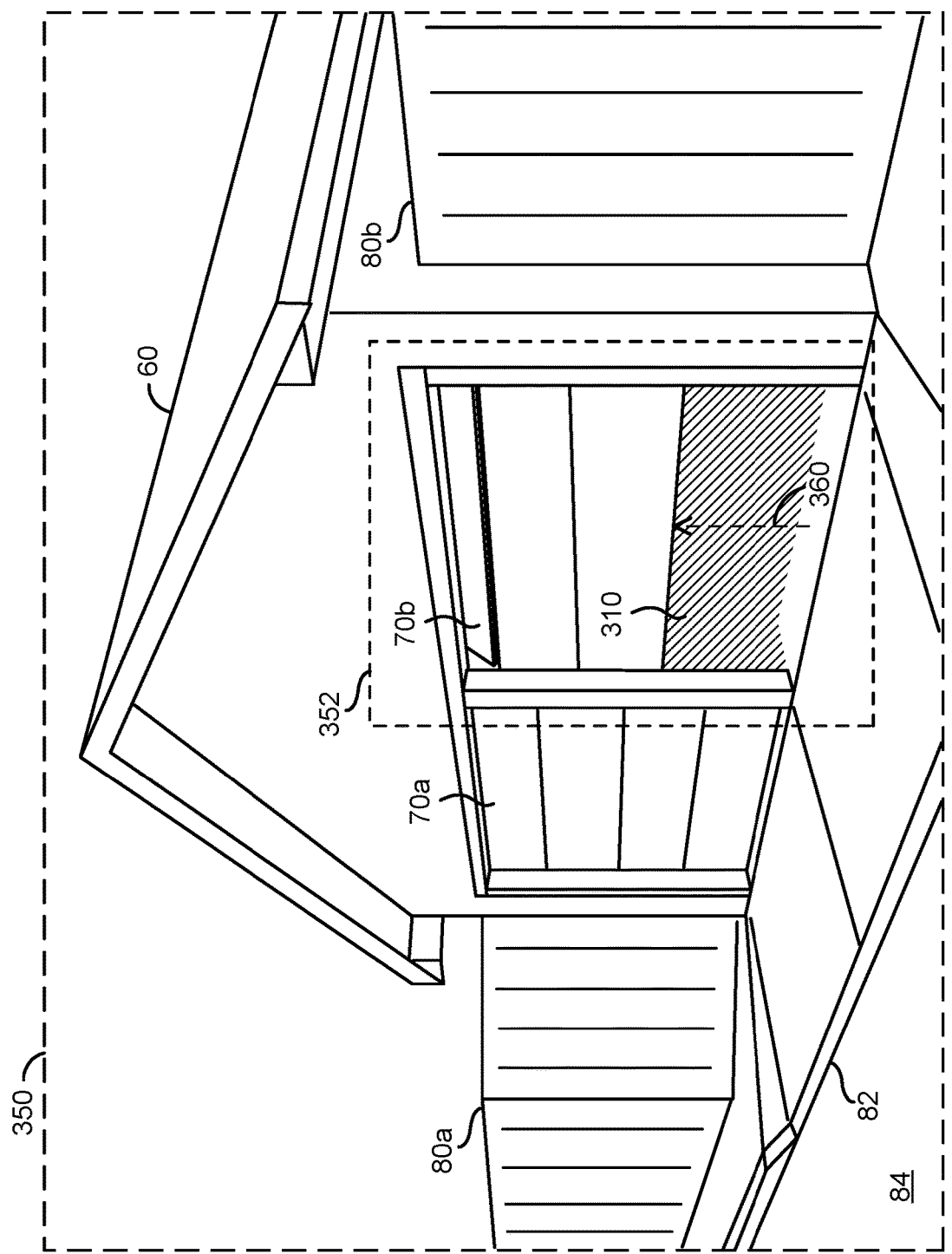
FIG. 5 is a diagram illustrating performing computer vision operations on an example video frame to confirm a visually observable status of an entryway.

Referring to FIG. 5, a diagram illustrating performing computer vision operations on an example video frame to a confirm visually observable status of an entryway is shown. An example video frame 350 is shown. The example video frame 350 may comprise pixel data captured by one or more of the capture devices 102a-102n. In one example, the video frame 350 may be provided to the processor 106a-106n as the signal FRAMES_A-FRAMES_N. In another example, the video frame 350 may be generated by the processors 106a-106n in response to the pixel data provided in the signal FRAMES_A-FRAMES_N. The pixel data may be received by the processors 106a-106n and video processing operations may be performed by the video processing pipeline 156 to generate the example video frame 350. In some embodiments, the example video frame 350 may be presented as human viewable video output to one or more of the displays 118a-118n. In some embodiments, the example video frame 350 may be utilized internal to the processor 106a-106n to perform the computer vision operations.

The example video frame 350 may comprise a view of the building 60 (e.g., a garage), the garage doors 70a-70b, fence portions 80a-80b, a driveway 82 and/or a road 84. For example, the video frame 350 may be captured from the perspective of the ego vehicle 50 driving on the road 84. The driveway 82 may provide a path to the garage doors 70a-70b of the building 60. The ego vehicle 50 may be driving towards the driveway 82 if the video frame 350 was captured by one of the capture devices 102a-102n mounted on a front of the ego vehicle 50. The ego vehicle 50 may be driving away from the driveway 82 if the video frame 350 was captured by one of the capture devices 102a-102n mounted on a rear of the ego vehicle 50. The example video frame 350 may represent a video frame captured by a front (or rear) mounted one of the capture devices 102a-102n. For example, the ego vehicle 50 may be driving on the road 84 and the driver 202 may be attempting to pull up the driveway 82. In one example, the video frame 350 may be captured by the rear lens 112c of the ego vehicle 50 and the ego vehicle 50 may be driving in reverse up the driveway 82.

A dotted shape 352 is shown. The dotted shape 352 may represent the detection of an object by the computer vision operations performed by the processors 106a-106n. The dotted shape 352 may comprise the pixel data corresponding to an object detected by the computer vision operations pipeline 162 and/or the CNN module 150. The dotted shape 352 is shown for illustrative purposes. In an example, the dotted shape 352 may be a visual representation of the object detection (e.g., the dotted shape 352 may not appear on an output video frame displayed on one of the displays 118a-118n). In another example, the dotted shape 352 may be a bounding box generated by the processors 106a-106n displayed on the output video frames to indicate that an object has been detected (e.g., the bounding box 352 may be displayed in a debug mode of operation).

The object 352 detected may be the garage door 70b. In the example shown, only one detected object 352 is shown for simplicity. Generally, the computer vision operations pipeline 162 and/or the CNN module 150 may detect multiple objects (or all the objects) captured within the video frame 350. For example, the CNN module 150 may detect the garage door 70a, the building 60, the fence 80a-80b, the driveway 82, windows on the building 60, lights on the building 60, other vehicles, people, animals, street signs, etc. The number and/or types of objects detected by the CNN module 150 may be varied according to the design criteria of a particular implementation.

The computer vision operations may be configured to detect characteristics of the detected objects. The characteristics of the objects may comprise a height, length, width, slope, an arc length, a color, an amount of light emitted, detected text on the object, a path of movement, a speed of movement, a direction of movement, etc. The characteristics of the detected object may comprise a status of the object (e.g., opened, closed, on, off, etc.). The types of characteristics detected may be varied according to the design criteria of a particular implementation.

The status characteristics of the detect objects may be context dependent. Different status characteristics may be stored by the memory 108 based on the classification of the object detected. In one example, for the garage doors 70a-70b, one type of status characteristic may be generally not relevant to the action invoked by the remote command provided (e.g., a color). For the garage doors 70a-70b, the visually observable status that corresponds to the action invoked by the remote command 304a-304n may comprise whether the entryway is open or closed (e.g., currently open, currently closed, partially closed, in the process of opening, in the process of closing, etc.). While the color of the garage doors 70a-70b may not be relevant to determining a status of the detected object with respect to the remote command, the color characteristic of the garage doors 70a-70b may be relevant for distinguishing the garage doors 70a-70b to other entryways. In another example, for other types of objects, the color may be a relevant status characteristic (e.g., detecting which colored light is active for a streetlight). The type of characteristics and/or status detected about a particular class of object may be varied according to the design criteria of a particular implementation.

A dotted arrow 360 is shown. The dotted arrow 360 may represent a visually observable status of the detected object 352. The dotted arrow 360 may be an illustrative example of the visually observable status (e.g., the arrow representing the status may not be visible). In one example, when the visually observable status 360 is presented to a vehicle system for displaying information on the displays 118a-118n, and the visually observable status 360 may be visible in a debug mode of operation to help indicate what type of status the processors 106a-106n have detected (e.g., as a visual overlay).

In one example, the visually observable status 360 may be detected from analyzing a single video frame. For example, the processors 106a-106n may determine that the garage door 70b has a visually observable status of partially open. Generally, the visually observable status 360 may be determined by performing the computer vision operations on a sequence of video frames (e.g., the example video frame 350 and a number of other video frames captured before and/or after the example video frame 350). In the example shown, the visually observable status 360 is represented as an upwards arrow (e.g., indicating the garage door 70b is opening). By analyzing the example video frame 350 and subsequently captured video frames, the processors 106a-106n may determine that the garage door 70b is lifting upwards (e.g., is in the process of opening).

The processors 106a-106n may be configured to compare the visually observable status 360 with the remote action invoked by the remote command 304a-304n provided (e.g., a post-communication confirmation). The comparison may use visual information determined using the computer vision operations to confirm whether the action invoked by the remote command 304a-304n has been (or currently is being) performed. If the visual information confirms that the remote command 304a-304n has been performed, then the processors 106a-106n may not need to perform a further action (e.g., the command has been performed successfully).

In some embodiments, the processors 106a-106n may provide a notification (e.g., a visual notification on the displays 118a-118n, an audio notification, etc.) that the command was successful. In some embodiments, the processors 106a-106n may record GPS/GNSS coordinates of the location of the ego vehicle 50 that corresponds to where the remote command 304a-304n was successfully sent from. If the visual information confirms that the remote command 304a-304n has not been performed, then the processors 106a-106n may attempt to re-send the remote command 304a-304n until the remote action intended to be invoked is successfully observed as being performed. In some embodiments, the processors 106a-106n may record GPS/GNSS coordinates of the location of the ego vehicle 50 that corresponds to where the failed remote command was sent from (e.g., to record a potential dead zone). If further attempts to send the remote command 304a-304n fail, the processors 106a-106n may provide a notification (e.g., a visual notification on the displays 118a-118n, an audio notification, etc.) that the command failed.

In one example, if the ego vehicle 50 is returning to the building 60, the action invoked by the remote command 304a-304n may be a command to open the garage door 70b. The processors 106a-106n may perform the comparison of the action invoked by the remote command 304a-304n (e.g., open the garage door 70b), to the visually observable status 360 (e.g., the garage door 70b in the process of opening). The comparison may confirm that the garage door 70b is opening as provided for by the remote command 304a-304n. The decision module 158 may determine that the remote command 304a-304n was successfully communicated based on the visual confirmation.

In another example, if the ego vehicle 50 is leaving the building 60, the action invoked by the remote command 304a-304n may be a command to close the garage door 70b. The processors 106a-106n may perform the comparison of the action invoked by the remote command 304a-304n (e.g., open the garage door 70b), to the visually observable status 360 (e.g., the garage door 70b in the process of opening). The comparison may confirm that the garage door 70b is opening, contrary to the action invoked by the remote command 304a-304n. The decision module 158 may determine that the remote command 304a-304n was not successfully communicated based on the visual confirmation.

In some embodiments, the processors 106a-106n may be configured to determine the visually observable status 360 before the remote command 304*a*-304*n* is provided and modify the remote command 304*a*-304*n* based on the visually observable status 360 (e.g., a pre-communication determination). The comparison may use visual information determined using the computer vision operations to determine the type action to invoke when sending the remote command 304*a*-304*n*. For example, the processors 106*a*-106*n* may detect the visually observable status 360 and determine that the garage door 70*b* is opened. The processors 106*a*-106*n* may modify or select the remote command 304*a*-304*n* to invoke an action to close the garage door 70*b* (e.g., only invoke an auto-close command when the garage door 70*b* is opened).

In another example, the processors 106*a*-106*n* may detect the visually observable status 360 and determine that the garage door 70*b* is closed. The processors 106*a*-106*n* may modify or select the remote command 304*a*-304*n* to open the garage door 70*b* (e.g., only invoke the auto-open command when the garage door 70*b* is closed). Similarly, if the ego vehicle 50 is returning to the building 60 and the processors 106*a*-106*n* detect that the visually observable status 360 of the garage door 70*b* is already opened, the processors 106*a*-106*n* may prevent (or not send) the remote command 304*a*-304*n* since the garage door 70*b* is already in the preferred state. After sending the remote command 304*a*-304*n*, the processors 106*a*-106*n* may additionally perform the post-command confirmation using the visual information.

In some embodiments, the processors 106*a*-106*n* may be configured store a GPS/GNSS of the ego vehicle 50 at a time when the example video frame 350 was captured. For example, GPS/GNSS data and/or address information may be stored along with the confirmation the processors 106*a*-106*n* determine about whether the remote command 304*a*-304*n* succeeded or failed. Storing previously determined success or failure locations may enable the processors 106*a*-106*n* to send the remote commands 304*a*-304*n* from known successful locations and avoid sending from known failure locations.

The processors 106*a*-106*n* may be configured to determine the type of remote command 304*a*-304*n* to send based on the visual information determined by the computer vision operations. In an example, for controlling the status of the entryways 70*a*-70*n*, the remote command 304*a*-304*n* may not merely provide a toggle command (e.g., if the door is open, then close and if the door is closed, then open). The computer vision operations may provide a vision-based context to determine the type of remote command to send. For example, if a door is opened, the computer vision operations may confirm that the door is open and that the correct context is to provide a close door command. Similarly, if the door is closed, the computer vision operations may confirm that the door is closed and that the correct context is to provide an open door command.

Figure 6:
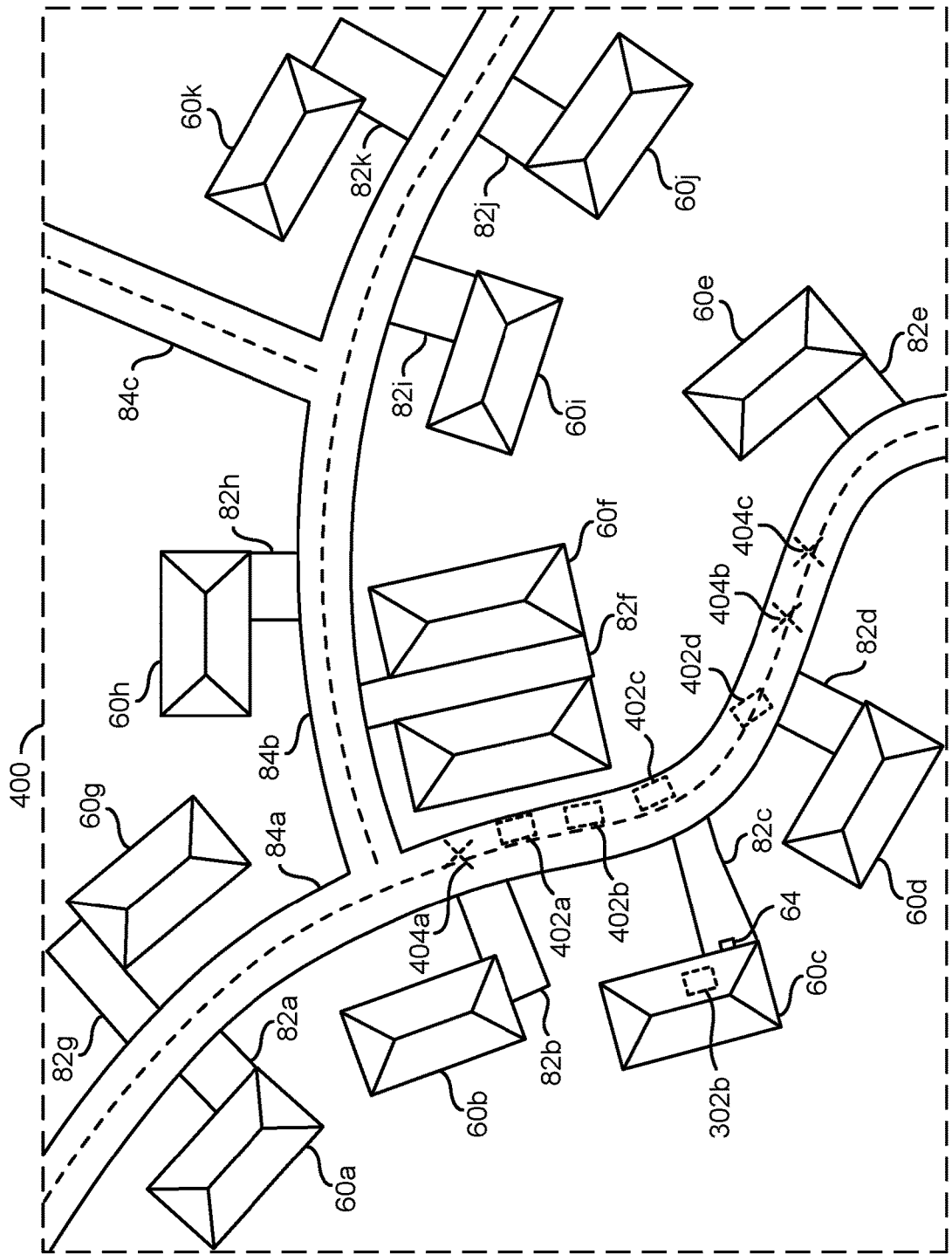
FIG. 6 is a diagram illustrating generating a map of locations based on a success or failure of a remote command.

Referring to FIG. 6, a diagram illustrating generating a map of locations based on a success or failure of a remote command is shown. A map 400 is shown. The map 400 may comprise map data readable by the processors 106*a*-106*n* and/or other systems of the ego vehicle 50. In some embodiments, the map 400 may be displayed on one or more of the displays 118*a*-118*n*. In some embodiments, the map 400 may be used internally by the processors 106*a*-106*n* (e.g., the map 400 may be a visual representation of map data stored by the memory 108).

The map 400 may comprise a number of buildings 60*a*-60*k*. Each of the buildings 60*a*-60*k* may have a respective one of the driveways 82*a*-82*k*. The driveways 82*a*-82*k* may be connected to one of the roads 84*a*-84*c*.

In the example map data 400, the home 60*c* may correspond to the ego vehicle 50. For example, the ego vehicle 50 and/or the camera system 100 may communicate the remote commands 304*a*-304*n* with various components of the home 60*c*. The ego vehicle 50 and/or the camera system 100 may be configured to have permissions to enable communication with the particular receivers 302*a*-302*n* installed at the home 60*c*. For example, the ego vehicle 50 and/or the camera system 100 may have permissions enable to communicate with the receivers 302*a*-302*n* of the home 60*c*, but may not have permissions to communicate with the receivers 302*a*-302*n* of the other homes 60*a*-60*b* and 60*d*-60*k*. In the example shown, the ego vehicle 50 and/or the camera system 100 may be configured to have permissions to communicate with the receivers 302*a*-302*n* of one home 60*c*. In some embodiments, the ego vehicle 50 and/or the camera system 100 may be configured to have permissions to communicate with the receivers 302*a*-302*n* of more than one home and/or building (e.g., a home and a secondary residence, a business property, etc.). In the example shown, the home 60*c* may comprise the receiver 302*b* for controlling the light 64.

The map data 400 may be stored in the memory 108. The map data 400 may be determined using GPS/GNSS data. The map data 400 may comprised information accessed from an API provided by a map service (e.g., Google Maps, Bing Maps, Apple Maps, OpenStreetMap, etc.). While the map data 400 is shown as generally two dimensional, the map data 400 may further comprise elevation information. In some embodiments, the elevation data may be determined based on data received from the map service and/or supplementing data with elevation information determined using the computer vision operations (e.g., detecting trees or other structures that may interfere with the communication of the remote command 304*a*-304*n*). The location of the ego vehicle 50 with respect to the map data 400 may be determined by the sensors 114. In one example, the sensors 114 may comprise GPS/GNSS location sensors. In another example, the sensors 114 may be configured to generate data for dead reckoning tracking (e.g., using information from the speed, acceleration and steering wheel). In yet another example, V2I and/or V2V communication may be performed to determine the location of the ego vehicle 50 with respect to the map data 400. The method of determining the location of the ego vehicle 50 with respect to the map data 400 may be varied according to the design criteria of a particular implementation.

The location of the ego vehicle 50 may be enhanced using the computer vision operations to perform self-localization. The visual information extracted from the video frames may be used to provide a location with a higher accuracy than GPS/GNSS location. In an example, the computer vision operations may be configured to detect the characteristics of landmarks (e.g., houses, trees, the shape of the streets, other structures, etc.) to determine a precise location. In another example, the computer vision operations may provide a relative location with respect to the home 60*c* using the characteristics of landmarks determined using the computer vision operations. The self-localization may be performed by using the pixel data and the characteristics of detected objects to precisely locate the ego vehicle 50 with respect to the detected objects. Details of the self-localization of the ego vehicle 50 using the computer vision operations may be described in association with U.S. application Ser. No.

16/672,759, filed on Nov. 4, 2019, appropriate portions of which are hereby incorporated by reference.

Dotted shapes 402a-402d are shown. The dotted shapes 402a-402d may be a rectangular shape. The rectangular shapes 402a-402d may represent success locations for the remote command 304a-304n. Dotted shapes 404a-404c are shown. The dotted shapes 404a-404c may represent failure locations for the remote command 304a-304n. The success locations 402a-402d and/or the failure locations 404a-404c may be determined based on previous attempts to communicate the remote command 304a-304n. When the visual confirmation using the computer vision operations indicates that the visually observable status of the feature, system and/or component (e.g., the detected object) matches the action invoked by the remote command 304a-304n, the location may be stored in the memory 108 (e.g., the look-up table 170) as one of the success locations 402a-402b. When the visual confirmation using the computer vision operations indicates that the visually observable status of the object does not match the action invoked by the remote command 304a-304n, the location may be stored in the memory 108 as one of the failure locations 404a-404c. Over time, the memory 108 may provide a database of locations that failed and/or locations that succeeded for communicating the remote command 304a-304n.

In some embodiments, the success locations 402a-402d and the failure locations 404a-404c may be generated for each of the receivers 302a-302n for a particular one of the buildings 60a-60n. For example, the receiver 302a (not shown) may be located at a different area of the home 60c than the receiver 302b. As a result of the different locations of the receiver 302a and the receiver 302b in the home 60c, the remote command 304a-304n sent from the same location of the ego vehicle 50 may succeed for the receiver 302a but fail for the receiver 302b.

In the example shown, the ego vehicle 50 and/or the camera system 100 may be configured to communicate the remote command 304a-304n to the receiver 302b to control the light 64. The computer vision operations may be configured to determine the whether the visually observable status of the light matches the remote command 304a-304n provided. For example, when the ego vehicle 50 had previously left the home 60c the remote command 304a-304n may have been sent to turn off the light 64. At the failure location 404a, the command to turn off the light 64 may not have been successful (e.g., the computer vision operations detected that the light 64 remained in the on state). At the success location 402a, the command to turn on the light 64 may have been successful (e.g., the computer vision operations detected that the status of the light 64 was turned off). Similarly, the light 64 may have been confirmed (e.g., using the computer vision operations) to be turned off when the ego vehicle was at the success location 402b and the success location 402c. For example, the failure location 404a may be farther from the home 60c (and the receiver 302b) than the success locations 402a-402c (e.g., a farther location may be more likely to not successfully communicate the remote command 304a-304n due to interference and/or signal attenuation).

In the example shown, when the ego vehicle 50 had previously returned to the home 60c, the remote command 304a-304n may have been sent to turn on the light 64. At the failure location 404b and the failure location 404c, the remote command 304a-304n to turn on the light 64 may not have been successful (e.g., the computer vision operations detected that the light 64 remained in the off state). At the success location 402d, the remote command 304a-304n to turn on the light 64 may have been successful (e.g., the computer vision operations detected that the light 64 turned on in response to the remote command 304a-304n).

The stored success locations 402a-402d and/or the stored failure locations 404a-404c may be used as references for future attempts to send the remote command 304a-304n (e.g., on a next visit to the building 60). For example, the processors 106a-106n may not attempt to send the remote commands 304a-304n when the ego vehicle 50 is at the failure locations 404a-404c in the future. The processors 106a-106n may wait until the ego vehicle reaches one of the success locations 402a-402d to send the remote command 304a-304n.

In the example shown, the ego vehicle 50 may return to the home 60 and reach the failure location 404c. The processors 106a-106n may prevent and/or deny the communication of the remote command 304a-304n at the failure location 404c. Next, the ego vehicle 50 may reach the closer failure location 404b and again the processors 106a-106n may not enable the remote command 304a-304n to be sent.

In some embodiments, the processors 106a-106n may wait until the ego vehicle 50 reaches the success location 402d before sending the remote command 304a-304n to the receiver 302b to turn on the light 64. In some embodiments, the processors 106a-106n may attempt to send the remote command 304a-304n to the receiver 302b from one or more locations between the failure locations 404b-404c (e.g., to determine if interference is not present between the failure locations 404b-404c) and/or between the failure location 404b and the success location 402d (e.g., to determine if there is another success location farther away from the building 60c than the success location 402d). The result of the communication of the remote command from the new locations may be analyzed using the computer vision operations and the new locations may be recorded as a failure location or a success location depending on whether the visually observable status of the light 64 matches the action invoked by the remote command 304a-304n.

Figure 7:
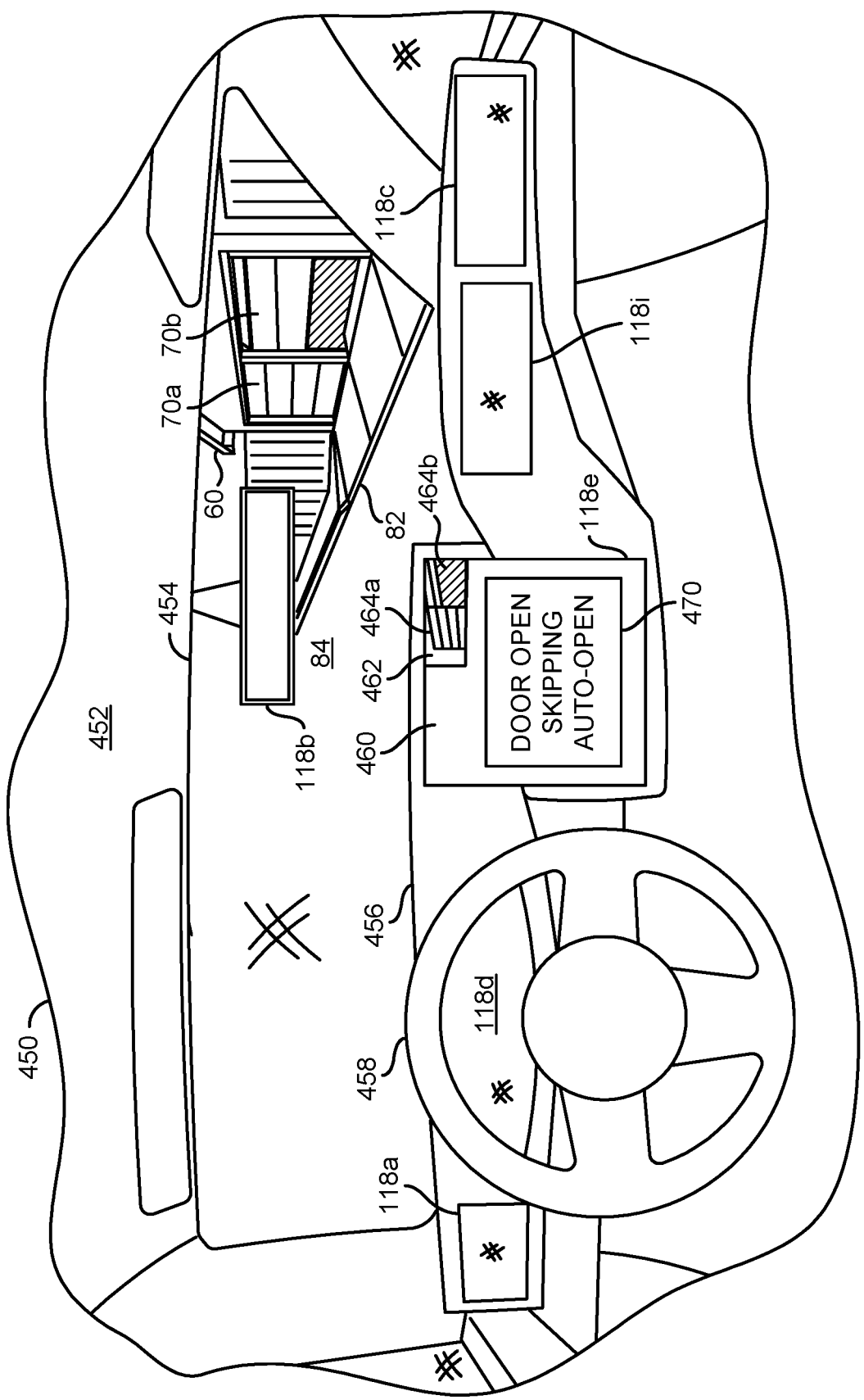
FIG. 7 is a diagram illustrating a notification generated on a display.

Referring to FIG. 7, a diagram illustrating a notification generated on a display is shown. A perspective 450 is shown. The perspective 450 may be a representation of a view of an interior 452 of the ego vehicle 50. The perspective 450 may generally provide a view of the interior 452 from the location and direction of the driver 202 but may not be what the driver 202 would actually see (e.g., may not be representative of a gaze direction).

The interior 452 of the ego vehicle 50 may comprise a windshield 454, a dashboard 456 and/or a steering wheel 458. A number of the displays 118a-118n are shown. In the example shown, the displays 118a-118i are shown throughout the interior 452. However, the number of the displays 118a-118n available in the ego vehicle 50 may be varied according to the design criteria of a particular implementation.

The building 60, the garage doors 70a-70b, the driveway 82 and the road 84 are shown. The building 60, the garage doors 70a-70b, the driveway 82 and the road 84 may be shown as part of the view through the windshield 454. For example, the ego vehicle 50 may be driving in a forward direction on the road 84. The ego vehicle 50 may be approaching the building 60 (e.g., returning to the building 60).

In the example shown, the display 118a may be located on the dashboard 456 to the left of the steering wheel 458. For example, the display 118a may be configured to display video data corresponding to the rear view from the driver side (e.g., emulating a driver side reflective mirror). In the example shown, the display 118b may be located at the top of the windshield 454. For example, the display 118b may be configured to display video data corresponding to the rear view (e.g., emulating a traditional reflective rearview mirror). In the example shown, the display 118c may be located on the dashboard 456 to the far right of the interior 452. For example, the display 118c may be configured to display video data corresponding to the rear view from the passenger side (e.g., emulating a passenger side reflective mirror).

The display 118d may be located on the dashboard 456 behind the steering wheel 458, and the displays 118e-118i may be located on the dashboard 456 at various locations to the right of the steering wheel 458. In one example, one or more of the displays 118d-118i may be configured to display vehicle information (e.g., warning icons, speed, distance, temperature, odometer, etc.). In another example, one or more of the displays 118d-118i may be configured as an infotainment touchscreen display (e.g., providing a user interface for audio, navigation, hands-free phone communication, etc.).

The processors 106a-106n may be configured to communicate any of the signals VOUT_A-VOUT_N to any of the displays 118a-118i. In an example, the user interface of the infotainment touchscreen (e.g., one of the displays 118a-118n) may be configured to enable the driver 202 (or a passenger in the ego vehicle 50) to customize the video output for each of the displays 118a-118n. In one example, the processors 106a-106n may enable one or more of the displays 118a-118n to duplicate a view. For example, the display 118a and the 118i may both display the rear view from the driver side emulating a driver side reflective mirror (e.g., to allow a driving instructor in the passenger seat to easily see the rear view from the passenger side). In another example, the processors 106a-106n may enable the driver 202 to select which of the displays 118a-118i display which video data. For example, the driver 202 may prefer to have the display 118e display the passenger side rear view instead of the display 118c, which is farther away.

The display 118e is shown as a large screen generally centered on the dashboard 456. The display 118e is shown displaying a video output 460. The video output 460 may be an example of information comprising the video data captured by the capture devices 102a-102n and/or additional information generated by the processors 106a-106n that may be shown to the driver 202. The video output 460 may be similar to the example video frame 350 shown in association with FIG. 5. The video output 460 may provide a view of the exterior of the ego vehicle 50 similar to what may be seen through the windshield 454. For example, the video output 460 may be a lower angle view than the view through the windshield 454 (e.g., the video output 460 may be captured by the lens 112e mounted to the front bumper of the ego vehicle 50). A representation 462 of the building 60 is shown as part of the video output 460. Representations 464a-464b of the garage doors 70a-70b are shown as part of the video output 460.

A visual notification 470 is shown as part of the video output 460. In an example, the visual notification 470 may provide a text-based message. In the example shown, the visual notification 470 may provide a message about the status of the garage doors 70a-70b and/or the remote command 304a-304n. In another example, the visual notification 470 may provide information about the ego vehicle 50 (e.g., low fuel, low battery, etc.). In yet another example, the visual notification 470 may provide information determined using the computer vision operations (e.g., pedestrian detected, potential collision with another vehicle, etc.). The type of message provided by the visual notification 470 may be varied according to the design criteria of a particular implementation.

The visual notification 470 may be generated by the processors 106a-106n as an overlay. The processors 106a-106n may generate the video VOUT_A-VOUT_N (e.g., comprising output video frames). The signals VOUT_A-VOUT_N may comprise video frames generated from the pixel data captured by the capture devices 102a-102n. The processors 106a-106n may add the visual notification 470 as a post-processing effect to the video frames (e.g., by adding content to the video data that was not physically present in the real world that was captured by the capture devices 102a-102n).

In the example shown, the visual notification 470 may comprise a pop-up message to communicate to the driver 202. In the example shown, the visual notification 470 may comprise the message "Door open. Skipping auto-open". For example, the computer vision operations may detect that the visually observable status of the garage door 70b is already open. Since the ego vehicle 50 is returning to the building 60 and the garage door 70b is already open, the remote command 304a-304n may not need to be sent. The visual notification 470 may provide the driver 202 with feedback about the commands sent. In another example, if the ego vehicle 50 were leaving the building 60 and the computer vision operations detected that the garage door 70b was still opened (e.g., the auto-close command failed), the visual notification 470 may provide the message that the garage door 70b is still open.

In some embodiments, other types of warnings may be implemented (e.g., as an alternative to the visual notification 470 or in addition to the visual notification 470). An audio notification may be implemented. In one example, an audio tone may be presented (e.g., one tone to indicate that the computer vision operations confirmed that the remote command 304a-304n was sent successfully and another audio tone to indicate that the computer vision operations determined that the remote command 304a-304n failed). A voice notification may be implemented. For example, pre-recorded voice audio and/or procedurally generated voice audio may tell the driver 202 about whether the remote command 304a-304n succeeded or failed based on the computer vision operations. For example, the voice may speak the message (e.g., "Door is already open. Skipping auto-open command"). The types of notifications provided may be varied according to the design criteria of a particular implementation.

The processors 106a-106n may be configured to determine if the ego vehicle 50 is beyond a range of communication between the ego vehicle 50 and the receivers 302a-302n. For example, when the ego vehicle 50 is leaving the building 60, the ego vehicle 50 may reach an end point of the range of communication for the remote command 304a-304n and then continue moving farther away. If the remote command 304a-304n does not succeed before reaching the end of the range of communication for the remote command 304a-304n the action invoked by the remote command 304a-304n may not be able to be performed. The notification 470 may be generated when the visually observable status does not indicate that the remote command 304a-304n has succeeded (e.g., the visually observable status of the garage door 70b is open when the ego vehicle 50 has moved beyond the range of communication). In some embodiments, the range of communication may be a pre-determined distance (e.g., based on the specifications of the communication device 110 and/or the receivers 302a-302n). In another example, the distance from the building 60 of the success locations 402a-402d may be used as an estimation of the range of communication (e.g., the range of communication may end when the ego vehicle 50 reaches the last success location 402a-402d and only failure locations 404a-404c are in the direction of travel of the ego vehicle 50).

Figure 8:
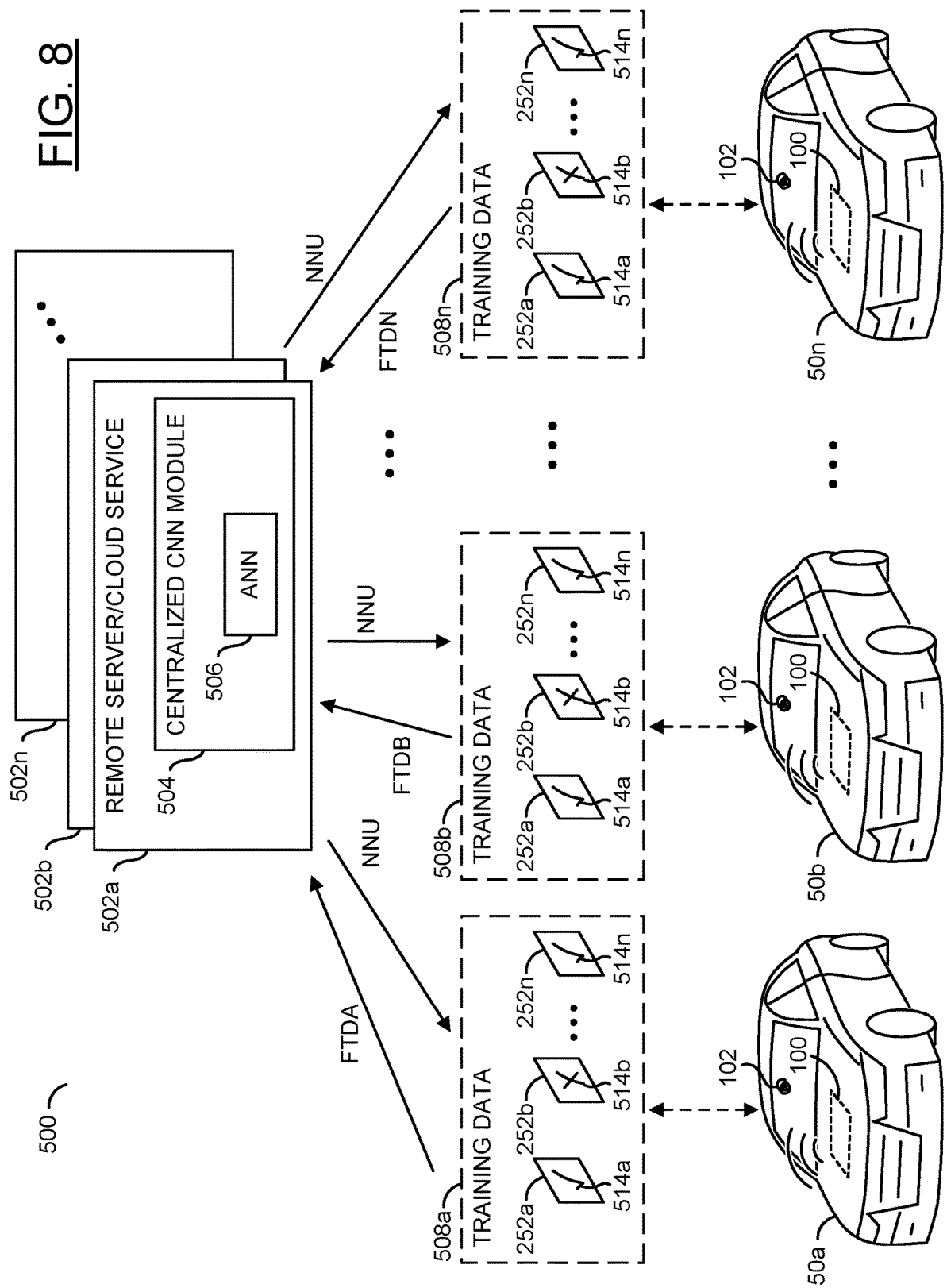
FIG. 8 is a diagram illustrating generating training data using fleet learning to train an artificial neural network and update edge nodes.

Referring to FIG. 8, a diagram illustrating generating training data using fleet learning to train an artificial neural network and update edge nodes is shown. A visualization 500 is shown. The visualization 500 may represent a flow of data to enable fleet learning to gather large amounts of data in order to train an artificial neural network and then update edge nodes with the updated neural network information.

In some embodiments, fleet learning may be implemented to gather large amounts of the training data 252a-252n. For example, cameras may be installed in production facilities (e.g., at the end of the production line) to capture many reference images of different types of vehicles to be used as the training data 252a-252n. In another example, the training data 252a-252n may comprise video data captured of various road types and/or driving scenarios (e.g., captured from a front camera of the ego vehicle 50 and/or from an all-around view captured by the capture devices 102a-102n). In still another example, the training data 252a-252n may comprise characteristics of various objects detected by both interior and exterior cameras (e.g., pedestrians, behavior of passengers of the ego vehicle 50, other vehicles, road signs, buildings, obstacles, animals, etc.). For example, the training data 252a-252n may be a sequence of video frames captured prior to the processors 106a-106n determining that an event has occurred using the sensors 114 (e.g., a change in orientation of the vehicle caused by a speed bump, an inclined surface, turning the steering wheel, etc.).

A number of blocks (or circuits) 502a-502n are shown. The circuits 502a-502n may comprise a number of server computers. For example, the server computers 502a-502n may be configured to perform parallel and/or scalable computing (e.g., share resources that scale based on demand). In an example, the server computers 502a-502n may implement a cloud computing service. Generally, the server computers 502a-502n may provide a service (centralized and/or distributed) that may be accessible by a number of nodes (e.g., a number of implementations of the camera system 100 implemented on a number of vehicles 50a-50n).

The cloud service 502a-502n may comprise a block (or circuit) 504. The circuit 504 may implement a centralized CNN module. The cloud service 502a-502n may comprise other components (not shown). The number and/or type of components implemented by the cloud service 502a-502n may be varied according to the design criteria of a particular implementation.

The centralized CNN module 504 may be implemented generally similar to the CNN module 150 implemented by the processors 106a-106n. Generally, the centralized CNN module 504 may be implemented on a larger scale and/or have access to a greater amount of computing resources than the CNN module 150. For example, the CNN module 150 may be implemented as an edge node that has relatively less communication capabilities (e.g., bandwidth may be limited while the ego vehicle 50 is in operation) and has relatively greater constraints (e.g., conserving energy may be a consideration in the computational resources available by the processors 106a-106n when the ego vehicle 50 is on operation). Generally, the centralized CNN module 504 may not operate with the same constraints as the CNN module 150. For example, the centralized CNN module 504 may have access to as much processing resources, memory resources and/or energy resources as are available to the cloud service 502a-502n.

The centralized CNN module 504 may comprise a block (or circuit) 506. The block 506 may implement an artificial neural network. The artificial neural network 506 may generally comprise similar operating capabilities as any of the artificial intelligence models 254a-254n. While one artificial neural network 506 is shown implemented by the centralized CNN module 504, the centralized CNN module 504 may comprise any number of artificial neural networks. The artificial neural network 506 may be configured to operate as a default (or master) branch of the neural network model that may be used for detecting object and/or classifying objects.

A number of vehicles 50a-50n are shown. The vehicles 50a-50n may comprise a fleet of vehicles. The vehicles 50a-50n are each shown comprising an implementation of the camera system 100. The vehicles 50a-50n are each shown comprising a capture device 102. Generally, each of the vehicles 50a-50n may have a similar implementation as the ego vehicle 50.

The fleet of vehicles 50a-50n may comprise vehicles owned by a single company (e.g., a fleet of trucks owned by a shipping company, a fleet of rental cars owned by a car rental company, a fleet of taxis owned by a taxi service, etc.). The fleet of vehicles 50a-50n may comprise vehicles produced by a single company (e.g., vehicles that are all the same make/model/year). The fleet of vehicles 50a-50n may comprise any group of vehicles that implement the camera system 100 (e.g., any type of vehicle owned by any number of different consumers). The types of vehicles 50a-50n used for fleet learning may be varied according to the design criteria of a particular implementation.

Blocks 508a-508n are shown. The blocks 508a-508n may represent data communicated by each camera system 100 in the fleet of vehicles 50a-50n. The blocks 508a-508n may communicate (e.g., upload) training data. The circuit 508 may comprise training data. For example, each of the vehicles 50a-50n may use the computer vision operations performed by the processors 106a-106n to generate the training data 252a-252n. The training data 252a-252n generated by each of the vehicles 50a-50n may be different.

By implementing the fleet learning, large amounts of data from various sources and/or various locations may be gathered. For example, the fleet of vehicles 50a-50n may gather the training data 252a-252n from entirely different countries. In one example, if the vehicle 50a is located in California, the training data 252a-252n may comprise video frames of roads, obstacles, people, etc. captured in warm and clear environments. In another example, if the vehicle 50b is located in northern Canada, the training data 252a-252n may comprise video frames of roads, obstacles, people, etc. captured in cold and icy environments. In yet another example, different interior colors of vehicles may be analyzed. In still another example, different drivers/passengers (e.g., different people) may be analyzed. In another example, different driving scenes (e.g., flat surfaces, clear weather, dark scenes, etc.) may be analyzed. In yet another example, different perspectives may be captured (e.g., a camera mounted on the roof of a truck may offer different viewing angles than a camera mounted on the roof of a sedan). A single source of data alone may not be capable of capturing multiple a wide range of environments. By implementing the fleet of vehicles 50a-50n the training data 252a-252n may provide a vast array of data that may help eliminate unintentional biases in the data gathered (e.g., if the training data only comprises data collected in warm regions, the computer vision operations may not be capable of detecting icy conditions).

The training data communication 508a-508n may comprise labeled training data. Training data video frames 252a-252n are shown in each of the training data communication 508a-508n generated by a respective one of the vehicles 50a-50n.

Each of the training data video frames 252a-252n may comprise a respective label 514a-514n. The labels 514a-514n may be provided in the metadata of the video frames 252a-252n. The labels 514a-514n may each provide an indication of whether the status of the detected object matched the remote command 304a-304n determined by the processors 106a-106n. In the example shown, the label 514a is shown as a checkmark indicating that there was a match (e.g., the command was successful), the label 514b-514c is shown as an X indicating that there was not a match (e.g., the command failed) and the label 514n is shown as a checkmark indicating that there was a match. The type of data provided as the label 514a-514n that indicates whether or not the status detected using computer vision matches the remote command 304a-304n may be varied according to the design criteria of a particular implementation.

The labels 514a-514n may enable the training data 252a-252n to train the artificial intelligence model 506. In one example, the labels 514a-514n may be generated in response to the computer vision operations performed by the processors 106a-106n. For example, the video frames may comprise a timestamp and confirmation performed using the computer vision operations may be applied to the video frames that correspond to the time when the processors 106a-106n determined that the remote command 304a-304n succeeded or failed. In another example, a user, such as the driver 202, may provide an input (e.g., using the interface 104 such as a touchscreen interface and/or communicating via the communication device 110 by connecting a smartphone that provides an app for providing feedback) and the input may indicate whether or not the remote command 304a-304n succeeded or failed. The input from the user may be used to provide the labels 514a-514n for the training data 252a-252n. The method of providing the labels 514a-514n for the training data 252a-252n may be varied according to the design criteria of a particular implementation.

The vehicles 50a-50n are shown communicating respective signals (e.g., FTDA-FTDN). The signals FTDA-FTDN may be presented to the cloud service 502a-502n. The signals FTDA-FTDN may communicate the training data 252a-252n to the centralized CNN module 150.

The training data 252a-252n from each of the vehicles 50a-50n may be uploaded to a centralized CNN module 504 to perform and/or train the artificial neural network 506. The centralized CNN module 504 may develop, refine and/or enhance the machine learning model implemented by the artificial neural network 506 in response to the training data 252a-252n received from multiple sources (e.g., each of the vehicles 50a-50n that implements the camera system 100).

By aggregating the training data 252a-252n received from multiple different sources, the artificial neural network 506 may be continually updated in response to an increasing amount of ground truth data.

The cloud service 502a-502n is shown communicating a signal (e.g., NNU). The signal NNU may be communicated to each of the vehicles 50a-50n. The signal NNU may comprise an update for the CNN module 150 of the camera system 100 implemented by each of the fleet of vehicles 50a-50n. For example, the updated results of the training of the centralized CNN module 504 may be installed on each of the CNN modules 150 of each apparatus 100 (or transmitted while the apparatus 100 is in operation to remotely provide updates via the communication devices 110). The same update signal NNU may be communicated to each of the vehicles 50a-50n to provide the latest version of the artificial intelligence model to each camera system 100.

Since the CNN module 150 implemented by each one of the vehicles 50a-50n may comprise an edge node, the artificial intelligence models 254a-254n may be simplified versions of the artificial intelligence model 506. In an example, the cloud service 502a-502n may be configured to quantize the artificial intelligence model 506 before communicating the quantized artificial intelligence model update as the signal NNU. The quantized version of the artificial intelligence model 506 may enable the CNN module 150 to perform the computer vision operations within the constraints of the processors 106a-106n.

The training data 252a-252n may be generated by each camera system 100 in the fleet of vehicles 50a-50n. For example, every confirmation by the computer vision operations of the success or failure of the remote command 304a-304n may be used to provide the metadata labels 514a-514n for the training data 252a-252n. The labeled training data 508a-508n may be uploading the data (e.g., over LTE or home Wi-Fi) to the cloud service 502a-502n to improve the dataset for retraining the artificial neural network 506. In one example, the training data 252a-252n may be uploaded as new training data is generated (e.g., real-time communication). In another example, the training data 252a-252n may be uploaded as discrete bulk uploads (e.g., all stored training data 252a-252n may be uploaded once per day at a particular time). The improved neural network may be communicated as the signal NNU to the fleet.

Figure 9:
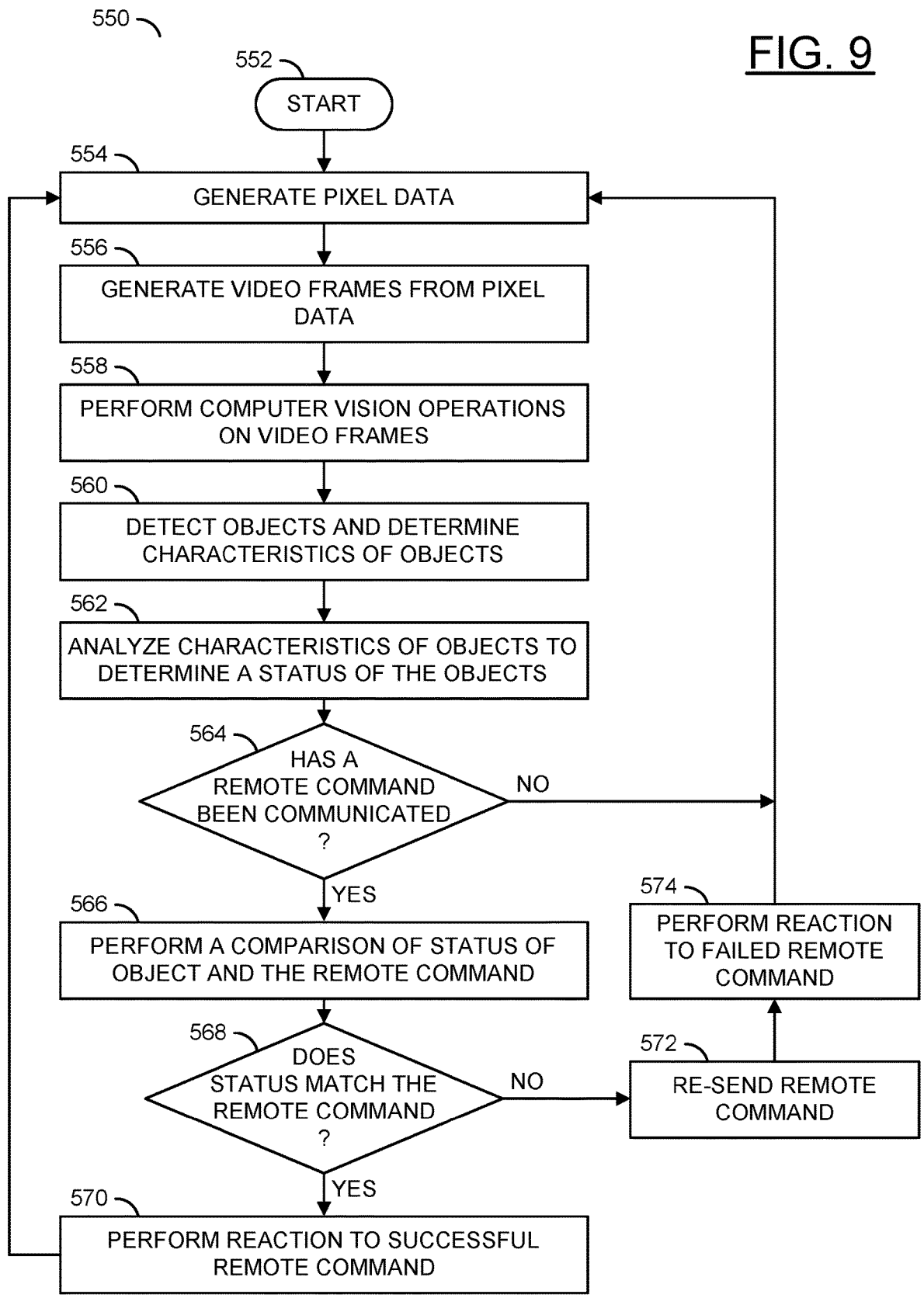
FIG. 9 is a flow diagram illustrating a method for performing a vision-based, in-vehicle remote command assist.

Referring to FIG. 9, a method (or process) 550 is shown. The method 550 may perform a vision-based, in-vehicle remote command assist. The method 550 generally comprises a step (or state) 552, a step (or state) 554, a step (or state) 556, a step (or state) 558, a step (or state) 560, a step (or state) 562, a decision step (or state) 564, a step (or state) 566, a decision step (or state) 568, a step (or state) 570, a step (or state) 572, and a step (or state) 574.

The step 552 may start the method 550. In the step 554, the processors 106a-106n may receive and/or generate pixel data. One or more of the capture devices 102a-102n may present the signals FRAMES_A-FRAMES_N to the processors 106a-106n. Next, in the step 556, the processors 106a-106n may generate video frames from the pixel data. For example, one or more of the dedicated hardware modules 180a-180n and/or the video processing pipeline 156 may generate video frames from the signals FRAMES_A-FRAMES_N. Next, the method 550 may move to the step 558.

In the step 558, the processors 106a-106n may perform computer vision operations on the video frames. In an example, the video processing pipeline 156 may present the video frames to the CNN module 150 as the video frames are generated to enable real-time computer vision operations. Next, in the step 560, the CNN module 150 may perform object detection and/or determine the characteristics of the objects detected. The object detection, along with classification and/or segmentation may be part of the computer vision operations performed by the CNN module 150. In the step 562, the CNN module 150 may analyze the characteristics of the objects to determine a visually observable status of the objects. In one example, the CNN module 150 may analyze the garage door 70b to determine the visually observable status 360 (e.g., opened, close, in process of opening, in process of closing, etc.). The status 360 may comprise a visually observable action or state of the observable device. Next, the method 550 may move to the decision step 564.

In the decision step 564, the processors 106a-106n may determine whether the remote command 304a-304n has been communicated. In one example, the processors 106a-106n may provide instructions to the communication devices 110 to communicate the remote command 304a-304n. In another example, other systems of the ego vehicle 50 may send the remote command 304a-304n and the processors 106a-106n may read from the interface 104 that the remote command 304a-304n has been sent. If the remote command 304a-304n has not been sent, then the method 550 may return to the step 554. If the remote command 304a-304n has been sent, then the method 550 may move to the step 566.

In the step 556, the processors 106a-106n may perform a comparison of the visually observable status 360 of the observable object and the remote command 304a-304n. Next, the method 550 may move to the decision step 568.

In the decision step 568, the decision module 158 may determine whether the visually observable status 360 matches the invoked action communicated by the remote command 304a-304n. For example, the decision module 158 may determine if the visually observable status of the object (e.g., the garage door 70a-70b, the light 64, a sprinkler system, etc.) currently matches or is in the process of achieving a match (e.g., a door is opening or a door is closing, etc.) with the instruction provided by the remote command 304a-304n. If the visually observable status 360 matches the remote command 304a-304n, then the method 550 may move to the step 570. In the step 570, the processors 106a-106n may perform the reaction to the successful remote command. In one example, the reaction may comprise providing the notification to the driver 202 (e.g., the visual notification 470 that the door properly closed, an audio message, etc.). In another example, the reaction may comprise storing the location of the successful communication of the remote command 304a-304n. Next, the method 550 may return to the step 554.

In the decision step 568, if the visually observable status 360 does not match the remote command 304a-304n, then the method 550 may move to the step 572. In the step 572, the processors 106a-106n may attempt to re-send the remote command 304a-304n. In one example, if the processors 106a-106n are not responsible for communicating the remote commands, then the processors 106a-106n may communicate a failure status on the interface 104 to cause the ego vehicle 50 to re-send the remote command 304a-304n. Next, in the step 574, the processors 106a-106n may perform a reaction to the failed command. In one example, the reaction may comprise providing a notification to the driver 202 (e.g., the visual notification 470 indicating the failure, an audio message, etc.). In another example, the reaction may comprise storing the location of the failed communication of the remote command 304a-304n. Next, the method 550 may return to the step 554.

Figure 10:
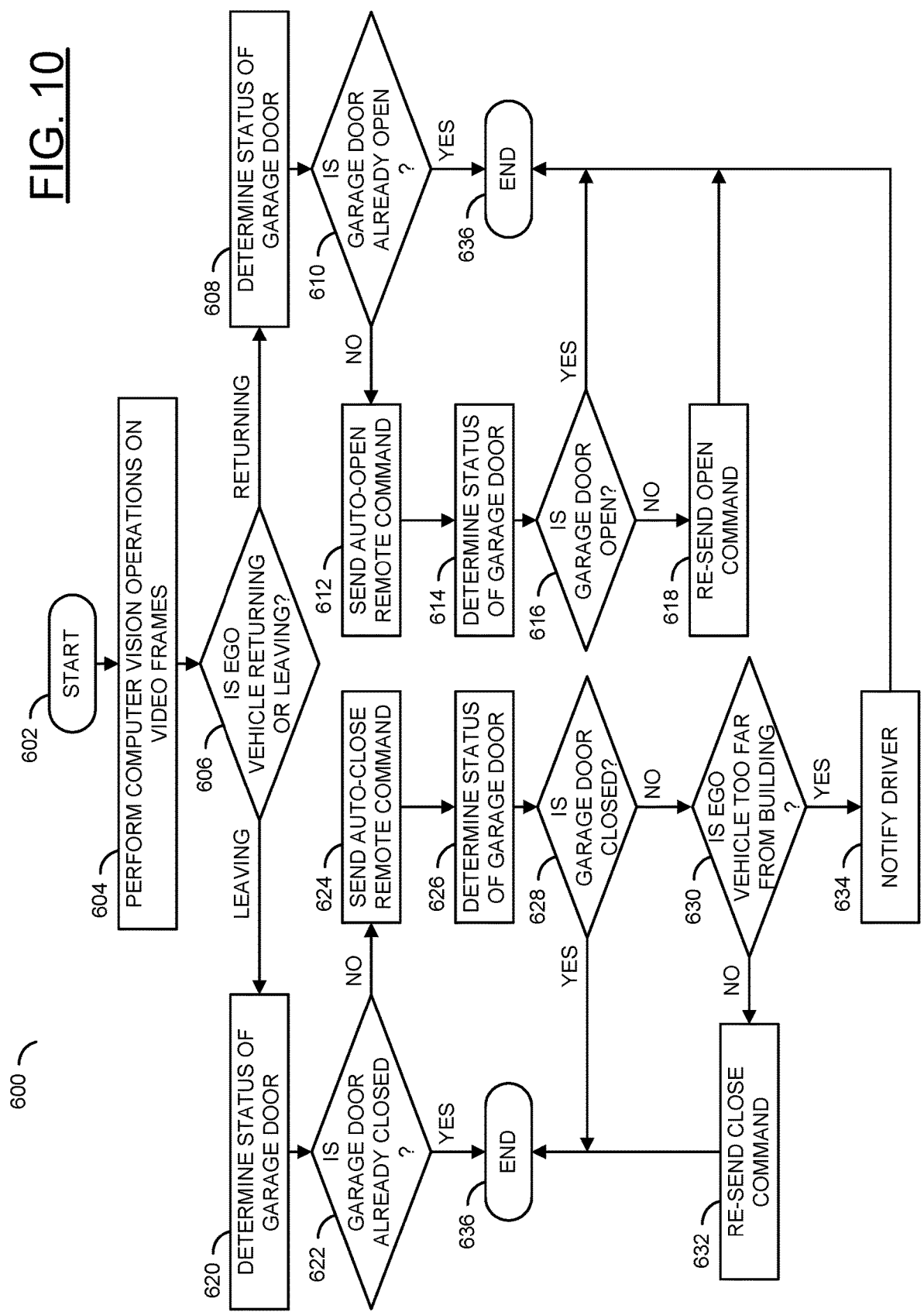
FIG. 10 is a flow diagram illustrating a method for performing a visually observable remotely invoked action for a garage door.

Referring to FIG. 10, a method (or process) 600 is shown. The method 600 may perform a visually observable remotely invoked action for a garage door. The method 600 generally comprises a step (or state) 602, a step (or state) 604, a decision step (or state) 606, a step (or state) 608, a decision step (or state) 610, a step (or state) 612, a step (or state) 614, a decision step (or state) 616, a step (or state) 618, a step (or state) 620, a decision step (or state) 622, a step (or state) 624, a step (or state) 626, a decision step (or state) 628, a decision step (or state) 630, a step (or state) 632, a step (or state) 634, and a step (or state) 636.

The step 602 may start the method 600. In the step 604, the processors 106a-106n may perform the computer vision operations on the video frames. Next, the method 600 may move to the decision step 606.

In the decision step 606, the processors 106a-106n may determine whether the ego vehicle 50 is returning to or leaving the building 60. For example, the CNN module 150 may compare the size of the building 60 over a sequence of video frames (e.g., a decreasing size may indicate that the ego vehicle 50 is moving farther away and leaving and an increasing size may indicate that the ego vehicle 50 is moving closer and returning). In another example, the sensors 114 may provide GPS data to indicate that the ego vehicle 50 is returning to or leaving the building 60. If the ego vehicle 50 is determined to be returning, then the method 600 may move to the step 608.

In the step 608, the processors 106a-106n may determine the visually observable status 360 of the garage door 70b. Next, the method 600 may move to the decision step 610. In the decision step 610, the processors 106a-106n may determine whether the garage door 70b is already open. For example, the computer vision operations may be performed to determine the visually observable status 360 of the garage door 70b. If the visually observable status 360 of the garage door 70b is already open, then the method 600 may move to the step 636 (e.g., no further action may be needed by the processors 106a-106n since the status of the garage door 70b may already be in the desired open state when returning to the building 60). If the visually observable status 360 of the garage door 70b is not open, then the method 600 may move to the step 612.

In the step 612, the processors 106a-106n (or the ego vehicle 50) may send the remote command 304a-304n providing an auto-open command. Next, in the step 614, the processors 106a-106n may perform the computer vision operations to determine the visually observable status 360 of the garage door 70b. Next, the method 600 may move to the decision step 616.

In the decision step 616, the decision module 158 may determine whether the garage door 70b is open in response to the auto-open command. For example, the computer vision operations may be performed to determine whether the auto-open command has been performed as desired. If the garage door 70b is determined to be opened (or in the process of opening), then the method 600 may move to the step 636. If the garage door 70b is determined not to be opened (or in the process of opening), then the method 600 may move to the step 618. In the step 618, the processors 106a-106n may re-send the remote command 304a-304n to perform an auto-open. Next, the method 600 may move to the step 636. The step 636 may end the method 600.

In the decision step 606, if the ego vehicle 50 is determined to be leaving the building 60, then the method 600 may move to the step 620. In the step 620, the processors 106a-106n may determine the visually observable status 360 of the garage door 70b. Next, the method 600 may move to the decision step 620.

In the decision step 620, the processors 106a-106n may determine whether the garage door 70b is already closed. For example, the computer vision operations may be performed to determine the visually observable status 360 of the garage door 70b. If the visually observable status 360 of the garage door 70b is already closed, then the method 600 may move to the step 636 and end the method 600 (e.g., no further action may be needed by the processors 106a-106n since the status of the garage door 70*b* may already be in the desired closed state when leaving to the building 60). If the visually observable status 360 of the garage door 70*b* is not closed, then the method 600 may move to the step 624.

In the step 624, the processors 106*a*-106*n* (or the ego vehicle 50) may send the remote command 304*a*-304*n* providing an auto-close command. Next, in the step 626, the processors 106*a*-106*n* may perform the computer vision operations to determine the visually observable status 360 of the garage door 70*b*. Next, the method 600 may move to the decision step 628.

In the decision step 628, the decision module 158 may determine whether the garage door 70*b* is closed in response to the auto-close command. For example, the computer vision operations may be performed to determine whether the auto-close command has been performed as desired. If the garage door 70*b* is determined to be closed (or in the process of closing), then the method 600 may move to the step 636 and the method 600 may end. If the garage door 70*b* is determined not to be closed (or in the process of closing), then the method 600 may move to the decision step 630.

In the decision step 630, the processors 106*a*-106*n* may determine whether the ego vehicle 50 is too far from the building 60. In one example, the ego vehicle 50 may be determined to be too far from the building 60 based on a GPS/GNSS location. In another location the ego vehicle 50 may be determined to be too far from the building 60 based on the location of the success locations 402*a*-402*d* and/or the failure locations 404*a*-404*c*. If the ego vehicle 50 is not too far away from the building 60, then the method 600 may move to the step 632. In the step 632, the processors 106*a*-106*n* may re-send the remote command 304*a*-304*n* providing the close command. Next, the method 600 may move to the end step 636.

In the decision step 630, if the ego vehicle 50 is too far away from the building 60, then the method 600 may move to the step 634. In the step 634, the processors 106*a*-106*n* may notify the driver 202 of the failed communication of the remote command 304*a*-304*n*. In one example, the processors 106*a*-106*n* may generate the visual notification 470 on one or more of the displays 118*a*-118*n*. In another example, the processors 106*a*-106*n* may generate an audio notification. Next, the method 600 may move to the end step 636.

Figure 11:
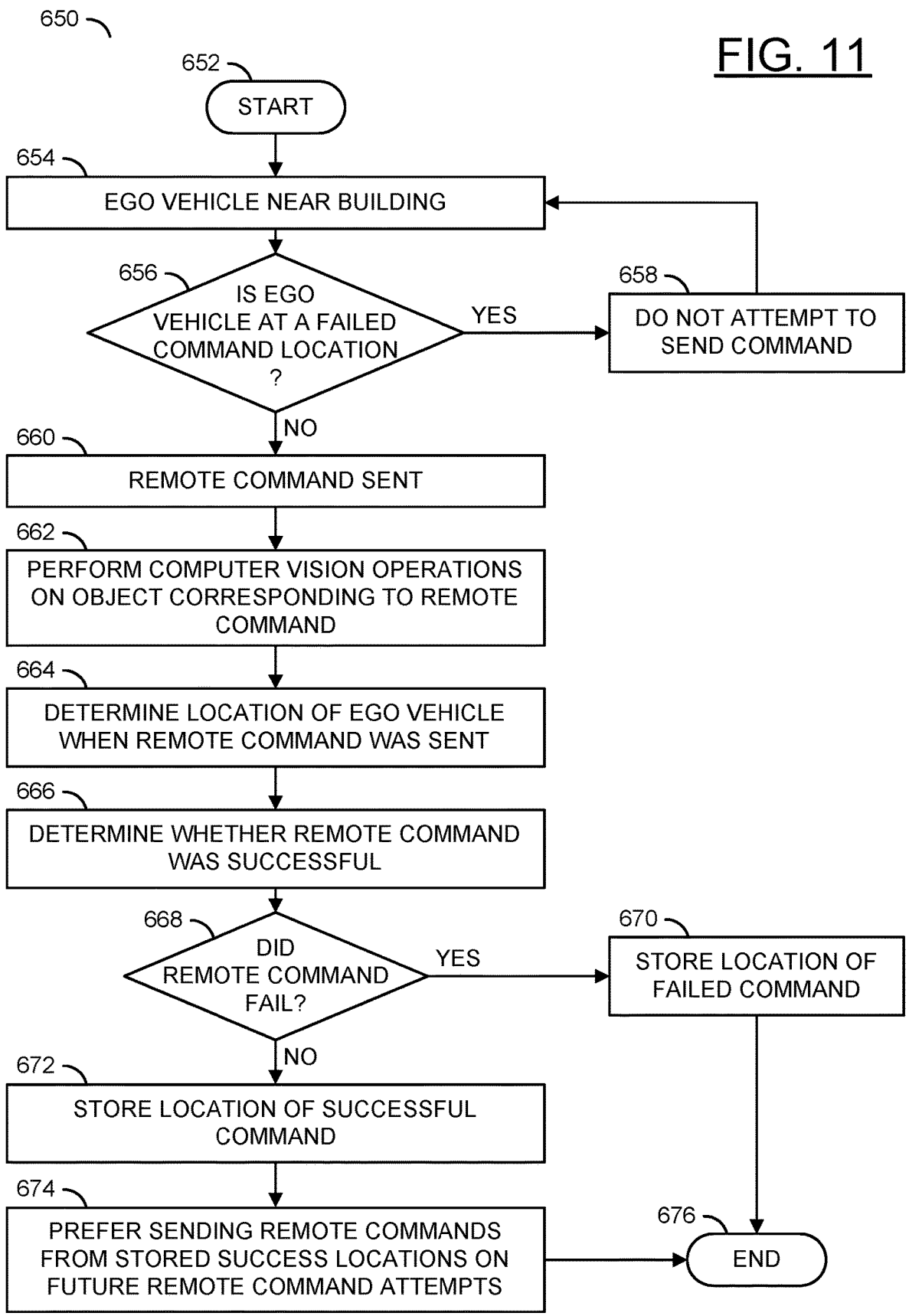
FIG. 11 is a flow diagram illustrating a method for using map data to store locations of successful and failed remote commands.

Referring to FIG. 11, a method (or process) 650 is shown. The method 650 may use map data to store locations of successful and failed remote commands. The method 650 generally comprises a step (or state) 652, a step (or state) 654, a decision step (or state) 656, a step (or state) 658, a step (or state) 660, a step (or state) 662, a step (or state) 664, a step (or state) 666, a decision step (or state) 668, a step (or state) 670, a step (or state) 672, a step (or state) 674, and a step (or state) 676.

The step 652 may start the method 650. In the step 654, the ego vehicle 50 may be near the building 60. Next, the method 650 may move to the decision step 656.

In the decision step 656, the processors 106*a*-106*n* may determine whether the ego vehicle 50 is at one of the failure locations 404*a*-404*c*. In one example, the GPS/GNSS location may be used to determine whether the ego vehicle 50 is currently at one of the failure locations 404*a*-404*c*. In another example, the computer vision operations may determine the location of the ego vehicle 50 visually (e.g., based on recognizing landmarks). If the ego vehicle 50 is at one of the failure locations 404*a*-404*c*, then the method 650 may move to the step 658. In the step 658, the processors 106*a*-106*n* may not attempt to send the remote command 304*a*-304*n* (e.g., or instruct the ego vehicle 50 to not attempt to communicate the remote command 304*a*-304*n*). In the decision step 656, if the ego vehicle 50 is not at one of the failure locations 404*a*-404*c*, then the method 650 may move to the step 660.

In the step 660, the remote command 304*a*-304*n* may be sent. Next, in the step 662, the processors 106*a*-106*n* may perform the computer vision operations on the object corresponding to the remote command 304*a*-304*n* (e.g., the observable device such as the light 64, the entrances 70*a*-70*n*, the sprinkler system 74, motorized window shutters, etc.). In the step 664, the processors 106*a*-106*n* may determine the location of the ego vehicle 50 when the remote command 304*a*-304*n* was sent (e.g., based on GPS/GNSS data and/or using computer vision operations to detect landmarks). Next, in the step 666, the decision module 158 may determine whether the remote command 304*a*-304*n* was successful (e.g., the visually observable status 360 matches the invoked command provided). Next, the method 650 may move to the decision step 668.

In the decision step 668, the processors 106*a*-106*n* may determine whether the remote command 304*a*-304*n* failed. If the remote command 304*a*-304*n* has failed (e.g., the visually observable status 360 does not match the remote command 304*a*-304*n* based on the extracted visual data), then the method 650 may move to the step 670. In the step 670, the processors 106*a*-106*n* may store the location that the remote command 304*a*-304*n* was sent from in the memory 108 as one of the failure locations 404*a*-404*c*. Next, the method 650 may move to the step 676.

In the decision step 668, if the remote command 304*a*-304*n* did not fail (e.g., the visually observable status 360 does match the remote command 304*a*-304*n* based on the extracted visual data), then the method 650 may move to the step 672. In the step 672, the processors 106*a*-106*n* may store the location that the remote command 304*a*-304*n* was sent from in the memory 108 as one of the success locations 402*a*-402*d*. Next, in the step 674, the processors 106*a*-106*n* may prefer sending the remote command 304*a*-304*n* from the stored success locations 402*a*-402*d* on future attempts (e.g., for a next visit) of sending the remote command 304*a*-304*n* (e.g., for the particular one of the receivers 302*a*-302*n*). For example, each time the ego vehicle 50 leaves the building 60, the processors 106*a*-106*n* may prefer to send the command 304*a*-304*n* at one of the success locations 402*a*-402*d*. Next, the method 650 may move to the step 676. The step 676 may end the method 650.

Figure 12:
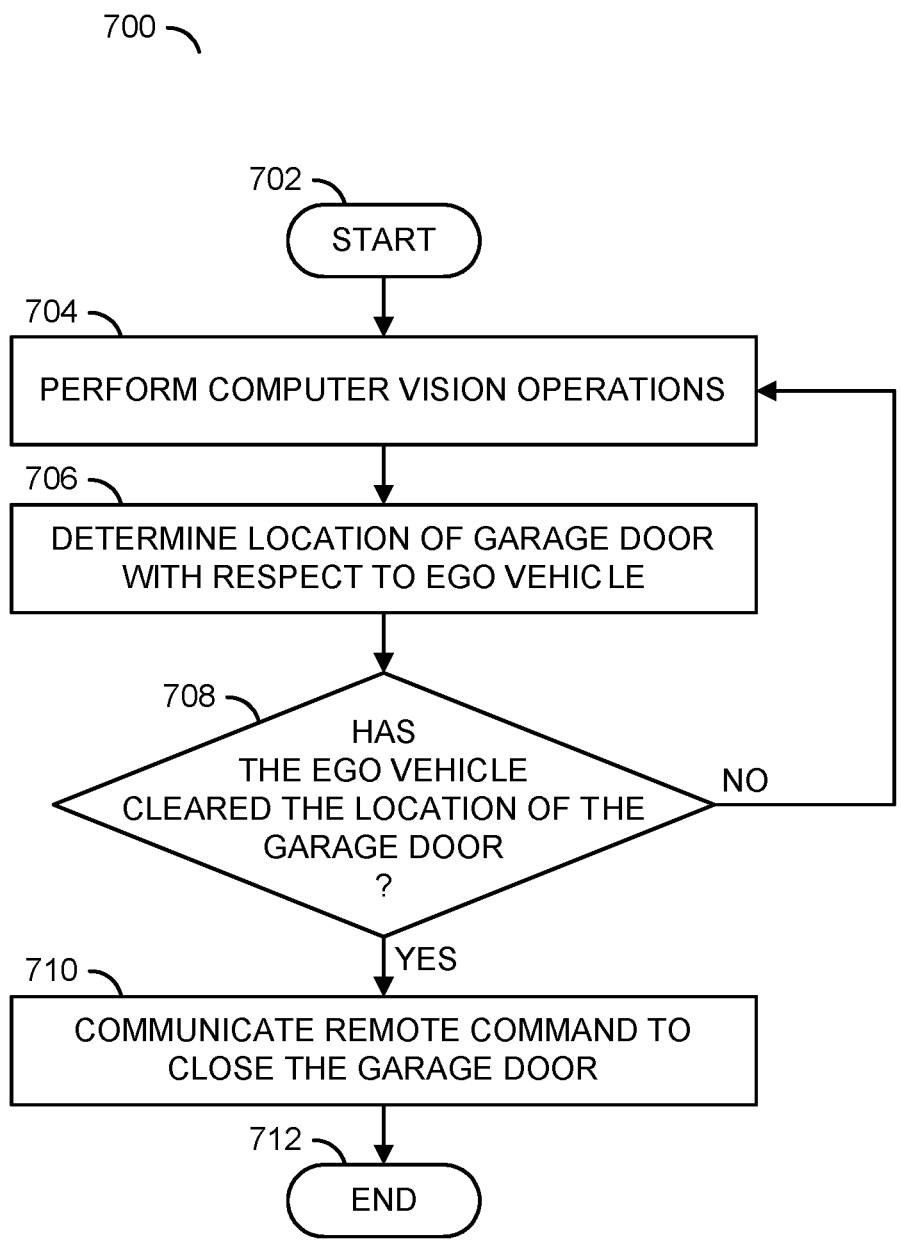
FIG. 12 is a flow diagram illustrating a method for performing the remote command based on a location of the ego vehicle.

Referring to FIG. 12, a method (or process) 700 is shown. The method 700 may perform the remote command based on a location of the ego vehicle. The method 700 generally comprises a step (or state) 702, a step (or state) 704, a step (or state) 706, a decision step (or state) 708, a step (or state) 710, and a step (or state) 712.

The step 702 may start the method 700. In the step 704, the processors 106*a*-106*n* may perform the computer vision operations on the video frames. Next, in the step 706, the processors 106*a*-106*n* may determine the location of the garage door 70*b* with respect to the ego vehicle 50. Next, the method 700 may move to the decision step 708.

In the decision step 708, the processors 106*a*-106*n* may determine whether the ego vehicle 50 has cleared the location of the garage door 70*b*. For example, if the ego vehicle 50 is backing out of the garage, the processors 106*a*-106*n* may determine whether the front end of the ego vehicle 50 has moved beyond the location where the garage door 70*b* closes (e.g., to prevent the garage door 70*b* from closing on the ego vehicle 50). In another example, if the ego vehicle 50 is pulling into the garage, the processors 106*a*-

106*n* may determine whether the rear end of the ego vehicle 50 has moved beyond the location where the garage door 70*b* closes. If the ego vehicle 50 has not cleared the location of the garage door 70*b*, then the method 700 may return to the step 704. If the ego vehicle 50 has cleared the location of the garage door 70*b*, then the method 700 may move to the step 710.

In the step 710, the processors 106*a*-106*n* may communicate the remote command 304*a*-304*n* to automatically close the garage door 70*b*. For example, the garage door 70*b* may be closed after the ego vehicle 50 is no longer in the way of the closure of the garage door 70*b*. Next, the method 700 may move to the step 712. The step 712 may end the method 700.

Figure 13:
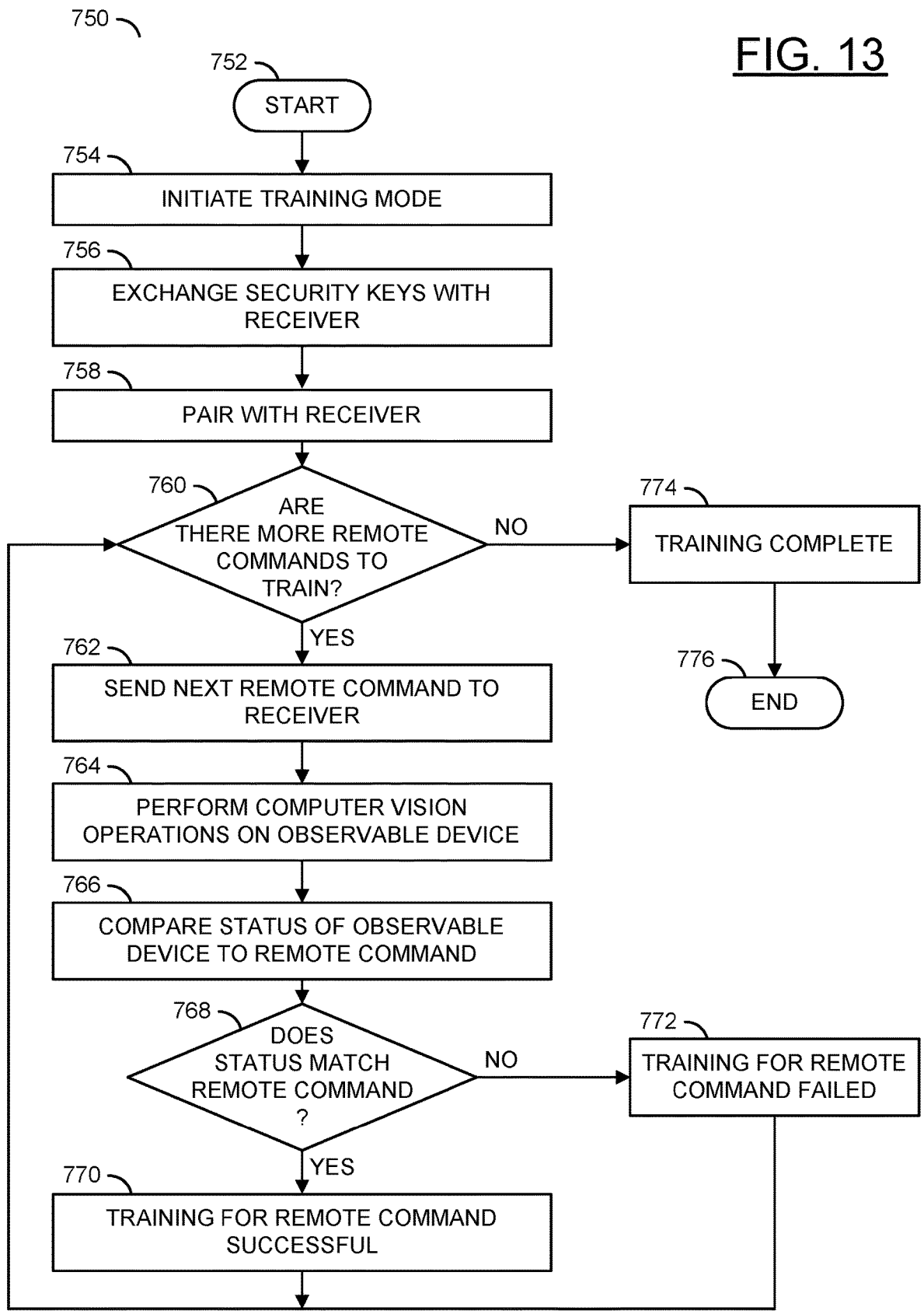
FIG. 13 is a flow diagram illustrating a method for training a visually observable device.

Referring to FIG. 13, a method (or process) 750 is shown. The method 750 may train a visually observable device. The method 750 generally comprises a step (or state) 752, a step (or state) 754, a step (or state) 756, a step (or state) 758, a decision step (or state) 760, a step (or state) 762, a step (or state) 764, a step (or state) 766, a decision step (or state) 768, a step (or state) 770, a step (or state) 772, a step (or state) 774, and a step (or state) 776.

The step 752 may start the method 750. In the step 754, the processors 106*a*-106*n* may initiate a training mode for the vision based, in-vehicle, remote command assist. In one example, the driver 202 may press a button (e.g., use a touchscreen interface of one of the displays 118*a*-118*n*) to initiate the training mode. Next, in the step 756, the processors 106*a*-106*n* may exchange security keys with one or more of the receivers 302*a*-302*n*. Exchanging the security keys may be used to ensure that the processors 106*a*-106*n* have permission to control the receivers 302*a*-302*n*. In the step 758, the processors 106*a*-106*n* may pair with one or more of the receivers 302*a*-302*n* for training. Next, the method 750 may move to the decision step 760.

In the decision step 760, the processors 106*a*-106*n* may determine whether there are more of the remote commands to train. In an example, for the receiver 302*c* for controlling the garage door 70*b*, there may be one remote command that invokes an action for closing the garage door 70*b* and another remote command that invokes an action for opening the garage door 70*b*. In another example, for one of the receivers 302*a*-302*n* for controlling a home sprinkler system, there may be one command that invokes an action for turning on the sprinklers, another command that invokes an action for turning off the sprinklers and/or additional commands for turning on/off individual sprinkler locations of the home sprinkler system. In yet another example, there may be more remote commands to train if the computer vision system determines that the training for the remote command has failed (e.g., the remote command may be re-trained). If there are more remote commands to train, then the method 750 may move to the step 762.

In the step 762, the processors 106*a*-106*n* may initiate a transmission of the remote command 304*a*-304*n* to the appropriate one of the receivers 302*a*-302*n* (e.g., sent using the communication device 110 and/or an alternate communication device implemented by the ego vehicle 50). Next, the processors 106*a*-106*n* may perform the computer vision operations on the observable device (e.g., the light 64, the doors 70*a*-70*n*, the sprinkler system 74, etc.) to determine the visually observable status 360. In the step 766, the processors 106*a*-106*n* may compare the visually observable status 360 of the observable device to the action invoked by the remote command 304*a*-304*n*. Next, the method 750 may move to the decision step 768.

In the decision step 768, the decision module 158 may determine whether the visually observable status 360 of the observable device matches the action invoked by the remote command 304*a*-304*n*. If the visually observable status 360 does match the action invoked by the remote command 304*a*-304*n*, then the method 750 may move to the step 770. In the step 770, the processors 106*a*-106*n* may determine that the remote command 304*a*-304*n* was communicated and performed successfully (e.g., the appropriate one of the receivers 302*a*-302*n* received the remote command and perform the desired response). For example, if the remote command 304*a*-304*n* was intended to close the garage door 70*b* as shown in association with FIG. 4, the training may be successful if the receiver 302*c* received the command and performed a close operation on the garage door 70*b*. Next, the method 750 may return to the decision step 760.

In the decision step 768, if the visually observable status 360 does not match the action invoked by the remote command 304*a*-304*n*, then the method 750 may move to the step 772. In the step 772, the processors 106*a*-106*n* may determine that the remote command 304*a*-304*n* was either not communicated or was not performed successfully (e.g., the appropriate one of the receivers 302*a*-302*n* either did not receive the remote command 304*a*-304*n* or did not perform the desired response). For example, if the remote command 304*a*-304*n* was intended to close the garage door 70*b* as shown in association with FIG. 4, the training may not be successful if the receiver 302*d* received the command and performed a close operation on the garage door 70*c*. Similarly, the training may not be successful if the remote command 304*a*-304*n* was intended to close the garage door 70*b* as shown in association with FIG. 4, and the status 360 of the garage door 70*b* was determined to be opened. Next, the method 750 may return to the decision step 760. For example, when the method 750 returns to the decision step 760 from the failure step 772, the camera system 100 may re-attempt to perform the previous remote command 304*a*-304*n*.

In the decision step 760, if there are no more remote commands to train, then the method 750 may move to the step 774. In the step 774, the processors 106*a*-106*n* may determine that the training is complete. Next, the method 750 may move to the step 776. The step 776 may end the method 750.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data of an area external to a vehicle; and
a processor configured to (i) generate video frames from said pixel data, (ii) perform computer vision operations on said video frames to (a) detect an object in said video frames and (b) determine characteristics of said object, (iii) analyze said characteristics of said object to determine a visually observable status of said object in response to sending a remote command, (iv) perform a comparison of said visually observable status to said remote command to determine whether an action of said object has been performed in response to said remote command and (v) resend said remote command if said comparison determines that said action of said object in response to said action initiated by said remote command has not been performed, wherein
 (i) said apparatus is implemented in said vehicle,
 (ii) said remote command is generated while said vehicle is moving with respect to said object, and
 (iii) said action performed in response to said remote command is configured to control said visually observable status of said object.

2. The apparatus according to claim 1, wherein said object comprises a garage door.

3. The apparatus according to claim 1, wherein (i) said vehicle comprises a display device, (ii) said processor is further configured to (a) output said video frames to said display device and (b) present a message on said display device and (c) said message comprises a warning about said visually observable status of said object.

4. The apparatus according to claim 1, wherein (i) said object is an entryway and (ii) said processor is configured to select (a) an open command for said action performed in response to said remote command when said visually observable status of said entryway is closed and (b) a close command for said action performed in response to said remote command when said visually observable status of said entryway is open.

5. The apparatus according to claim 1, wherein (i) said object is an entryway and (ii) when said remote command provides an open command to said entryway said processor is configured to confirm that said visually observable status of said entryway is (a) open or (b) in a process of opening and (iii) when said remote command provides a close command to said entryway said processor is configured to confirm that said visually observable status of said entryway is (a) closed or (b) in a process of closing.

6. The apparatus according to claim 1, wherein (i) said object comprises a light, (ii) said visually observable status comprises said light being on or off and (iii) said action performed in response to said remote command is configured to turn said light on or off.

7. The apparatus according to claim 1, wherein (i) said processor is configured to use said pixel data and said characteristics of said object to perform self-localization for said vehicle and (ii) said self-localization is configured to precisely locate said vehicle with respect to said object.

8. The apparatus according to claim 7, wherein (i) said processor is further configured to use said self-localization to store (a) success locations where communicating said remote command resulted in said visually observable status of said object confirming that said action was performed in response to said remote command and (b) failure locations where communicating said remote command resulted in said visually observable status of said object detecting that said action was not performed in response to said remote command and (ii) on a next visit, said remote command is (a) not sent when said vehicle is at any of said failure locations and (b) sent when said vehicle is at one of said success locations.

9. The apparatus according to claim 1, wherein (i) said processor is configured to use GPS/GNSS data to perform localization of said vehicle and (ii) said localization is configured to locate said vehicle with respect to said object.

10. The apparatus according to claim 9, wherein (i) said processor is further configured to use said localization to determine (a) success locations where communicating said remote command resulted in said visually observable status of said object confirming that said action was performed in response to said remote command and (b) failure locations where communicating said remote command resulted in said visually observable status of said object detecting that said action was not performed in response to said remote command and (ii) on a next visit, said remote command is (a) not sent when said vehicle is at any of said failure locations and (b) sent when said vehicle is at one of said success locations.

11. The apparatus according to claim 1, wherein (i) said object comprises an entryway and (ii) said processor is further configured to (a) determine if said vehicle is beyond a range of said remote command with respect to said entryway and (ii) generate a warning if said visually observable status of said entryway is open when said vehicle is beyond said range of said remote command.

12. The apparatus according to claim 11 wherein (i) said vehicle comprises a display device and (ii) said processor is configured to (a) output said video frames to said display device and (b) generate said warning as an overlay on said display device.

13. The apparatus according to claim 12, wherein (i) said vehicle comprises an audio system and (ii) said processor is configured to generate an audio control signal to enable said audio system to present said warning.

14. The apparatus according to claim 1, wherein (i) said video frames generated by said processor are used as training data for an artificial intelligence model implemented by said processor and (ii) said artificial intelligence model is configured to enable said computer vision operations to perform said comparison of said visually observable status to said action performed in response to said remote command.

15. The apparatus according to claim 14, wherein (i) said processor is configured to generate label metadata for said video frames used as said training data and (ii) said label metadata provides an indication of whether said comparison correctly identified that said visually observable status confirmed that said action was performed in response to said remote command.

16. The apparatus according to claim 15, wherein (i) said processor is configured to receive an input from a user and (ii) said processor generates said label metadata based on said input from said user.

17. The apparatus according to claim 15, wherein (i) said artificial intelligence model is enhanced using said training data received from a fleet of vehicles and (ii) each vehicle in said fleet of vehicles comprises an implementation of said apparatus.

18. The apparatus according to claim 1, wherein (i) said remote command is configured to communicate to a receiver to remotely invoke said action and (ii) said receiver is configured to control said visually observable status of said object in response to said remotely invoking said action.

19. The apparatus according to claim 1, said apparatus is configured to implement a vision based, in-vehicle, assistance for said remote command.

20. The apparatus according to claim 1, wherein (a) said visually observable status of said object comprises a first status associated with approaching a predetermined location and a second status associated with leaving said predetermined location and (b) said processor is further configured to (i) determine whether said vehicle is approaching said predetermined location or leaving said predetermined location, (ii) determine said visually observable status of said object in response to said computer vision operations, (iii) if said vehicle is approaching said predetermined location then (a) determine whether said visually observable status is said first status, (b) do not send said remote command if said visually observable status is said first status, (c) send said remote command if said visually observable status is not said first status and (d) resend said remote command if said visually observable status does not change to said first status in response to sending said remote command, and (iv) if said vehicle is leaving said predetermined location then (a) determine whether said visually observable status is said second status, (b) do not send said remote command if said visually observable status is said second status, (c) send said remote command if said visually observable status is not said second status, (d) resend said remote command if (I) said visually observable status does not change to said second status in response to sending said remote command and (II) said vehicle is within a range of said remote command from said object and (e) generate a notification to a user indicating said visually observable status if (I) said visually observable status does not change to said second status in response to sending said remote command and (II) said vehicle is outside of said range of said remote command from said object.

* * * * *